US012636533B2

(12) United States Patent
Short

(10) Patent No.: US 12,636,533 B2
(45) Date of Patent: May 26, 2026

(54) LAYERED ABSORBENT SUBSTRATE INCORPORATING ACTIVATED CARBON AND SUPERABSORBENT MATERIALS

(71) Applicant: Gregg R. Short, Carlsbad, CA (US)

(72) Inventor: Gregg R. Short, Carlsbad, CA (US)

(73) Assignee: STAR LIBERTY LLC, Carlsbad, CA (US)

( * ) Notice: Subject to any disclaimer, the term of this patent is extended or adjusted under 35 U.S.C. 154(b) by 898 days.

(21) Appl. No.: 17/714,711

(22) Filed: Apr. 6, 2022

(65) Prior Publication Data

US 2022/0249894 A1 Aug. 11, 2022

Related U.S. Application Data

(63) Continuation-in-part of application No. 16/367,629, filed on Mar. 28, 2019, now Pat. No. 11,344,933.

(Continued)

(51) Int. Cl.
*A62D 3/33* (2007.01)
*B01J 20/20* (2006.01)
(Continued)

(52) U.S. Cl.
CPC ............... *A62D 3/33* (2013.01); *B01J 20/20* (2013.01); *B01J 20/26* (2013.01); *B01J 20/28035* (2013.01); *B01J 20/2805* (2013.01); *B32B 5/022* (2013.01); *B32B 5/16* (2013.01); *B32B 5/266* (2021.05); *B32B 5/30* (2013.01); *B32B 2250/40* (2013.01); *B32B 2262/0253* (2013.01); *B32B 2262/067* (2013.01); *B32B 2262/144* (2021.05); *B32B 2264/108* (2013.01);

(Continued)

(58) Field of Classification Search
CPC ... A62D 3/33; B01J 20/20; B01J 20/26; B01J 20/28035; B01J 20/2805; B32B 5/022; B32B 5/16; B32B 5/266; B32B 5/30; B32B 2250/40; B32B 2262/0253; B32B 2262/067; B32B 2262/144; B32B 2264/108; B32B 2264/12; B32B 2307/726; B32B 2307/732; B32B 2250/20; B32B 2432/00; A61M 5/3205; B09B 3/00
USPC ........................................................ 428/36.1
See application file for complete search history.

(56) References Cited

U.S. PATENT DOCUMENTS

2021/0169709 A1* 6/2021 Bauer ..................... A61L 15/24

* cited by examiner

*Primary Examiner* — Matthew D Matzek
(74) *Attorney, Agent, or Firm* — Thomas | Horstemeyer, LLP

(57) ABSTRACT

Example waste disposal substrates include multiple nonwoven layers comprising activated carbon, superabsorbent particles, and optionally fibers. The substrate may comprise from two to eight nonwoven layers, including at least one layer containing activated carbon in combination with fibers and at least one layer containing activated carbon without fibers. At least one layer may contain a mixture of activated carbon and superabsorbent particles. In representative constructions, the substrate includes two outermost nonwoven layers, two nonwoven layers containing activated carbon positioned inward of the outermost layers, two layers containing a mixture of activated carbon and superabsorbent particles positioned inward of the activated-carbon layers, and two interior nonwoven layers positioned between the mixture layers. The layered arrangement provides an integrated structure containing activated carbon and superabsorbent particles in selected combinations of nonwoven layers.

21 Claims, 7 Drawing Sheets

Related U.S. Application Data

(60) Provisional application No. 62/712,620, filed on Jul. 31, 2018, provisional application No. 62/684,392, filed on Jun. 13, 2018.

(51) Int. Cl.

| | |
|---|---|
| *B01J 20/26* | (2006.01) |
| *B01J 20/28* | (2006.01) |
| *B32B 5/02* | (2006.01) |
| *B32B 5/16* | (2006.01) |
| *B32B 5/26* | (2006.01) |
| *B32B 5/30* | (2006.01) |

(52) U.S. Cl.
CPC ..... *B32B 2264/12* (2013.01); *B32B 2307/726* (2013.01); *B32B 2307/732* (2013.01)

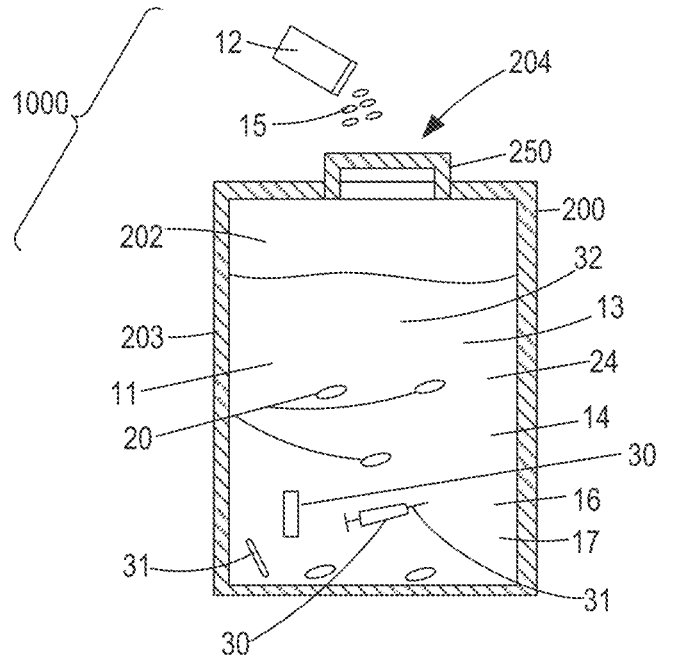
*FIG. 11A*
*FIG. 11B*
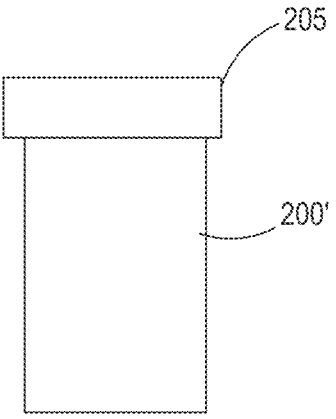
*FIG. 12*

LAYERED ABSORBENT SUBSTRATE INCORPORATING ACTIVATED CARBON AND SUPERABSORBENT MATERIALS

CROSS-REFERENCE TO RELATED APPLICATIONS

This patent application is a continuation-in-part patent application of (i) U.S. Utility patent application Ser. No. 16/367,629 filed on Mar. 28, 2019 and entitled "KITS AND METHODS FOR DISPOSING OF LIQUID PHARMA-CEUTICALS AND DISSOLVED SOLID PHARMACEU-TICALS," which claims the benefit of priority to (ii) U.S. Provisional Patent Application Ser. No. 62/684,392 filed on Jun. 13, 2018 and entitled "KITS AND METHODS FOR DISPOSING OF LIQUID PHARMACEUTICALS AND DISSOLVED SOLID PHARMACEUTICALS," and (iii) U.S. Provisional Patent Application Ser. No. 62/712,620 filed on Jul. 31, 2018 and entitled "KITS AND METHODS FOR DISPOSING OF LIQUID PHARMACEUTICALS AND DISSOLVED SOLID PHARMACEUTICALS," the subject matter of each of which is hereby incorporated by reference in their entirety.

FIELD OF THE INVENTION

The present invention relates generally to methods of disposing of liquid pharmaceuticals and dissolved solid pharmaceuticals. The present invention further relates to pharmaceutical disposal kits that may be used in the dis-closed methods of disposing of liquid pharmaceuticals and dissolved solid pharmaceuticals and/or sharps.

The present invention further generally relates to kit components suitable for use in the herein-described phar-maceutical disposal kits, and variations thereof, that may be used in a number of methods other than in methods of disposing of liquid pharmaceuticals and dissolved solid pharmaceuticals.

BACKGROUND OF THE INVENTION

Methods of disposing of solid pharmaceuticals and liquid pharmaceuticals, such as in a home, medical or hospital environment, typically comprise disposing of the pharma-ceuticals in a waste basket with or without any packaging, squirting into a sink or in a waste container, flushing down toilet, etc. Such conventional methods of disposing of phar-maceuticals create an unsafe, environmentally-unfriendly distribution of discarded pharmaceuticals.

There is a need in the art for simple, effective, safe and environmentally-friendly pharmaceutical disposal kits, as well as methods of disposing of liquid and dissolved phar-maceuticals.

SUMMARY OF THE INVENTION

The present invention is directed to simple, effective, safe and environmentally-friendly methods of disposing of phar-maceuticals. The disclosed methods of disposing of phar-maceuticals efficiently and safely enable proper disposal of pharmaceuticals. The disclosed pharmaceutical disposal sys-tems provide a cost-effective and convenient method of properly disposing of pharmaceuticals.

In the broadest sense, the present invention involves compositions, devices, kits, and methods for collecting, dissolving, adsorbing, inactivating, destroying, and/or dis-posing of pharmaceuticals.

In one exemplary embodiment, the method of disposing of liquid pharmaceuticals comprises depositing one or more liquid pharmaceuticals into or onto a substrate comprising (a)(i) fibers, (ii) foam, or (iii) both fibers and foam, and (b) activated carbon. The step of depositing one or more liquid pharmaceuticals into or onto the substrate may comprise, for example, using a syringe to input one or more liquid pharmaceuticals into or onto the substrate.

In another exemplary embodiment, the method of dispos-ing of liquid pharmaceuticals comprises depositing one or more liquid pharmaceuticals into or onto a substrate com-prising (a)(i) fibers, (ii) foam, or (iii) both fibers and foam, and (b) activated carbon, the substrate being proximate to, on, or within a container.

The present invention is also directed to liquid pharma-ceutical disposal kits for home use. In one exemplary embodiment, the pharmaceutical disposal kit comprises a substrate comprising (a)(i) fibers, (ii) foam, or (iii) both fibers and foam, and (b) activated carbon. The step of depositing one or more liquid pharmaceuticals into or onto the substrate may comprise, for example, using a syringe to input one or more liquid pharmaceuticals into or onto the substrate.

The present invention is further directed to methods of disposing of home generated solid pharmaceuticals, wherein the method comprises disposing of solid pharmaceuticals within a substrate comprising (a)(i) fibers, (ii) foam, or (iii) both fibers and foam, and (b) activated carbon. The step of depositing solid pharmaceuticals onto the substrate com-prises: mixing the solid pharmaceutical with water to dis-solve the solid pharmaceutical in, for example, a pill con-tainer, and then pouring the mixture onto the substrate, which can then be placed within a sealable container (e.g., a ZIPLOC' baggy). In other embodiments, the substrate itself is foldable into a configuration for disposal.

The present invention is further directed to methods of disposing of pharmaceuticals. In one exemplary embodi-ment, the method of disposing of pharmaceuticals com-prises: depositing one or more liquid pharmaceuticals and dissolved solid pharmaceuticals within and/or on a substrate comprising (a)(i) fibers, (ii) foam, or (iii) both fibers and foam, and (b) activated carbon, the substrate being proxi-mate to, on, or within a container; and depositing one or more additional liquid pharmaceuticals, dissolved solid pharmaceuticals, or any combination thereof into the con-tainer. In some embodiments, the substrate further comprises a color change "stripe" that undergoes a color change when combined with the effective amount of liquid. For example, the "stripe" would undergo a color change when combined with an effective amount of liquid pharmaceuticals and/or liquid in which is the dissolved solid pharmaceuticals.

The present invention is further directed to other phar-maceutical disposal kits for home or office use. In one embodiment, the pharmaceutical disposal kit comprises: a substrate comprising (a)(i) fibers, (ii) foam (not shown), or (iii) both fibers and foam, and (b) activated carbon; and (c) a container comprising: a container housing surrounding a container volume, a container opening providing access to the container volume from outside the container housing, and a movable container housing closure member sized to extend over and cover the container opening, wherein the substrate is proximate, on or within the container. Exem-plary containers include, but are not limited to, a plastic jug, a pill bottle, etc.

In other embodiments, the pharmaceutical disposal kit comprises: (I) a container comprising: a container housing surrounding a container volume, a container opening providing access to the container volume from outside the container housing, and a movable container housing closure member sized to extend over and cover the container opening; and (II) a mixture within container, the mixture comprising: (i) water occupying at least a portion of the container volume, (ii) activated carbon, (iii) a first monomeric component capable of polymerization when combined with an effective amount of a polymerization initiator, and (iv) an optional colorant that causes the mixture to undergo a color change upon polymerization of the first monomeric component.

The present invention is further directed to other method of disposing of liquids and/or solid pharmaceuticals. In one embodiment, the method of disposing of solid pharmaceuticals comprises a method of disposing of solid pharmaceuticals (e.g., pills, transdermal patches, etc.), wherein the method comprises: partially filling a pill bottle containing discardable (i.e., unused or expired) solid pharmaceuticals with water; and pouring/placing a solidifying composition into the pill bottle, the solidifying composition comprising (a) activated carbon and (b)(i) a gelling agent (not shown), (ii) superabsorbent particles, (iii) a polymerizable composition comprising a first monomeric component that is capable of polymerization when combined with an effective amount of a polymerization initiator, or (iv) any combination of (i), (ii), and (iii).

In other embodiments, the method of disposing of liquids and/or solid pharmaceuticals comprises: depositing one or more pharmaceuticals into a container containing (i) a first monomeric component, (ii) activated carbon and (iii) water, the first monomeric component being capable of polymerization when combined with an effective amount of a polymerization initiator. In some embodiments, the container may further contain a colorant that causes the mixture within the container to undergo a color change upon polymerization of the first monomeric component The present invention is further directed to pharmaceutical and/or sharps disposal kits. In one embodiment, the pharmaceutical and/or sharps disposal kit comprises: (I) a container comprising: a container housing surrounding a container volume, a container opening providing access to the container volume from outside the container housing, and a movable container housing closure member sized to extend over and cover the container opening; and (II) a mixture within the container, the mixture comprising: (i) water occupying at least a portion of the container volume, (ii) activated carbon, (iii) a first monomeric component capable of polymerization when combined with an effective amount of a polymerization initiator, and (iv) an optional colorant, the colorant enabling the mixture to undergo a color change when combined with the effective amount of the polymerization initiator.

The present invention is further directed to method of disposing of pharmaceutical and/or sharps. In one embodiment, the method of disposing of pharmaceutical and/or sharps comprises: depositing one or more pharmaceuticals, one or more syringes, one or more needles, one or more of the herein-described substrates comprising activated carbon, or any combination thereof into a container containing a mixture of: (i) water and (ii) a first monomeric component capable of polymerization when combined with an effective amount of a polymerization initiator, and (iv) an optional colorant, the colorant enabling the mixture to undergo a color change when combined with the effective amount of the polymerization initiator.

The present invention is even further directed to other solid pharmaceutical disposal kits comprising: a solidifying composition, the solidifying composition comprising activated carbon and (i) a gelling agent (not shown), (ii) superabsorbent particles, (iii) a first monomeric component that is capable of polymerization when combined with an effective amount of a polymerization initiator, (iv) an optional colorant, the colorant enabling the mixture to undergo a color change when combined with the effective amount of the polymerization initiator, or (v) any combination of (i), (ii), (iii) and (iv).

The present invention is even further directed to the above-described substrates, as well as methods of using the above-described substrates in methods other than in pharmaceutical disposal kits. In one embodiment, the substrate, referred to herein as "a waste disposal substrate," comprises: (a) at least one layer of fibers, (b) at least one layer comprising activated carbon; and (c) at least one layer comprising superabsorbent particles.

The present invention is yet further directed to methods of using waste disposal substrates. In one embodiment, the method of using a waste disposal substrate comprises contacting a waste disposal substrate with a liquid fluid, the waste disposal substrate comprising: (a) at least one layer of fibers, (b) at least one layer comprising activated carbon; and (c) at least one layer comprising superabsorbent particles, wherein the liquid fluid, or a component therein, is collected, dissolved, adsorbed, inactivated, destroyed, and/or disposed of within the waste disposal substrate. In some embodiments, the contacting step may comprise bringing the waste disposal substrate into contact with the liquid fluid, such as when using the waste disposal substrate as a wipe (e.g., a wiping structure having a size and shape similar to a paper towel). In other embodiments, the contacting step may comprise bringing the liquid fluid into contact with the waste disposal substrate, such as the introduction of a waste liquid fluid onto and into the waste disposal substrate.

These and other features and advantages of the present invention will become apparent after a review of the following detailed description of the disclosed embodiments and the appended claims.

BRIEF DESCRIPTION OF THE FIGURES

The present invention is further described with reference to the appended figure, wherein:

FIG. 11A depicts a cross-sectional view of the exemplary container shown in the exemplary pharmaceutical and/or sharps disposal kit of FIG. 10 as view along line 11A-11A shown in FIG. 10;

FIG. 11B depicts a bottom view of an exemplary container housing closure member for use with the exemplary container shown in FIGS. 10-11A; and FIG. 12 depicts a perspective view of another exemplary container for use in the pharmaceutical disposal kits of the present invention.

DETAILED DESCRIPTION OF THE INVENTION

Figure 1:
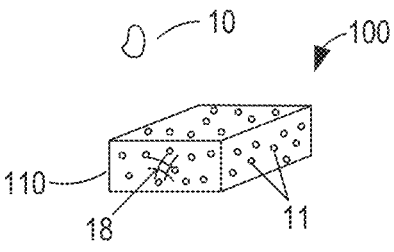
FIG. 1 depicts a perspective view of an exemplary substrate suitable for use in pharmaceutical disposal kits of the present invention.
Figure 2:
FIG. 2 depicts a perspective view of another exemplary substrate suitable for use in pharmaceutical disposal kits of the present invention.
Figure 3:
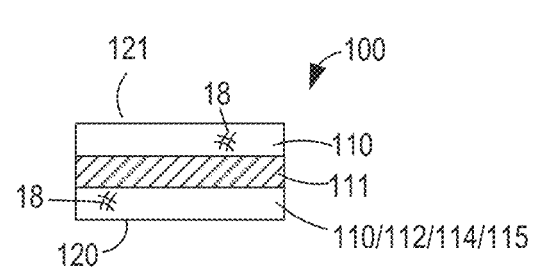
FIG. 3 depicts a side view of another exemplary substrate suitable for use in pharmaceutical disposal kits of the present invention.
Figure 4:
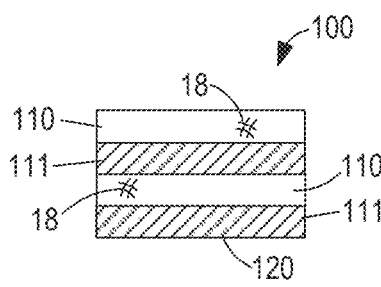
FIG. 4 depicts a side view of another exemplary substrate suitable for use in pharmaceutical disposal kits of the present invention.
Figure 5:
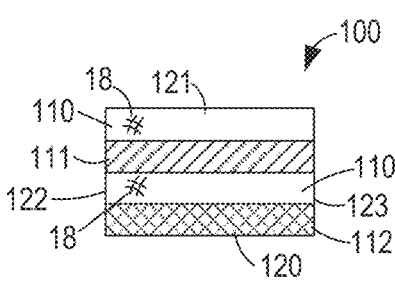
FIG. 5 depicts a side view of another exemplary substrate suitable for use in pharmaceutical disposal kits of the present invention.
Figure 6:
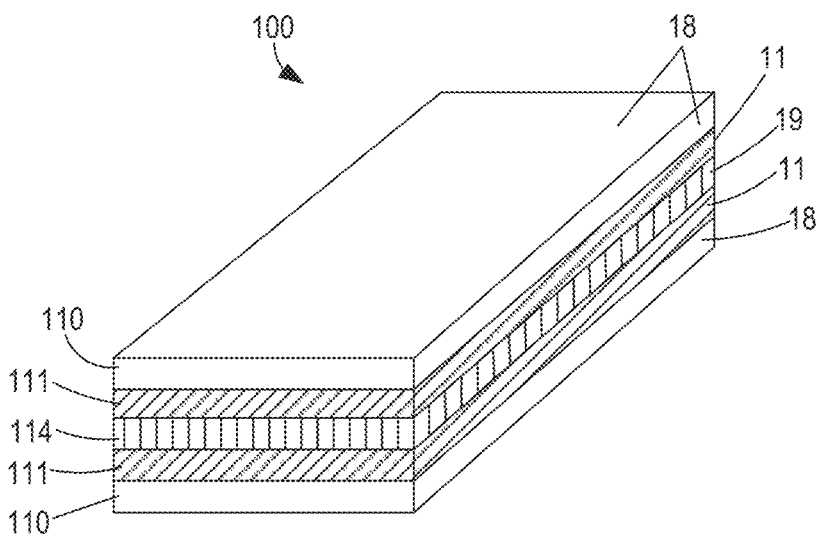
FIG. 6 depicts a perspective view of another exemplary substrate suitable for use in pharmaceutical disposal kits of the present invention.

The present invention is directed to methods of disposing of pharmaceuticals. The present invention is further directed to pharmaceutical disposal kits.

I. Methods of Disposing of Pharmaceuticals

The present invention is directed to methods of disposing of liquid pharmaceuticals and dissolved solid pharmaceuticals 20. FIGS. 1-12 depict exemplary pharmaceutical disposal kit components such as substrate 100 that may be used in the methods of the present invention.

As discussed above, the method of disposing of liquid pharmaceuticals and dissolved solid pharmaceuticals 20 may comprise disposing of one or more liquid pharmaceuticals and/or dissolved solid pharmaceuticals 20 into and/or onto a substrate 100. The substrate 100 may have any number of possible configurations such as those shown in FIGS. 1-8B. It should be understood that substrate 100 may comprise any number of layers of materials, combinations of materials, and layer configurations, such as those described herein, so as to dispose of liquid pharmaceuticals and dissolved solid pharmaceuticals 20.

II. Home and Professional Pharmaceutical Disposal Kits

The present invention is also directed to pharmaceutical disposal kits for use in a professional setting and/or a home setting. FIGS. 1-12 depict exemplary pharmaceutical disposal components such as substrate 100 and container 200 that may be used in the pharmaceutical disposal kits of the present invention.

III. Waste Disposal Substrates and Methods of Using the Same

The present invention is even further directed to waste disposal substrates comprises: (a) at least one layer of fibers, (b) at least one layer comprising activated carbon; and (c) at least one layer comprising superabsorbent particles.

The present invention is yet further directed to methods of using waste disposal substrates. In one embodiment, the method of using a waste disposal substrate comprises contacting a waste disposal substrate with a liquid fluid, the waste disposal substrate comprising: (a) at least one layer of fibers, (b) at least one layer comprising activated carbon; and (c) at least one layer comprising superabsorbent particles, wherein the liquid fluid, or a component therein, is collected, dissolved, adsorbed, inactivated, destroyed, and/or disposed of within the waste disposal substrate. In some embodiments, the contacting step may comprise bringing the waste disposal substrate into contact with the liquid fluid, such as when using the waste disposal substrate as a wipe (e.g., a wiping structure having a size and shape similar to a paper towel). In other embodiments, the contacting step may comprise bringing the liquid fluid into contact with the waste disposal substrate, such as the introduction of a waste liquid fluid onto and into the waste disposal substrate.

The present invention will be further described in the following additional embodiments, examples, and claims.

Additional Embodiments

Methods of Disposing of Liquid Pharmaceuticals

1. A method of disposing of liquid pharmaceuticals 10 (or dissolved solid pharmaceuticals 20 in, e.g., water), said method comprising: depositing one or more liquid pharmaceuticals 10 into or onto a substrate 100 comprising (a)(i) fibers 18, (ii) foam (not shown), or (iii) both fibers 18 and foam, and (b) activated carbon 11. As used in these additional embodiments, the term "liquid pharmaceuticals" is used to encompass liquid pharmaceuticals, as well as solid pharmaceuticals 20 that have been dissolved in a solvent such as water. In addition, the activated carbon mentioned throughout the present description may be any commercially available activated carbon. Suitable activated carbon includes, but is not limited to, activated carbon commercially available from General Carbon Corporation (Paterson, NJ); Parchem Fine & Specialty Chemicals (New Rochelle, NY), or any other activated carbon supplier. Typically, the activated carbon is present as a fine powder or particles. Activated carbon in the form of fibers may also be present.

2. The method of embodiment 1, wherein the substrate 100 comprises fibers 18.

3. The method of embodiment 1 or 2, wherein the substrate 100 comprises at least one fiber-containing layer 110. See, for example, FIG. 1, which shows a single layer 110 with activated carbon 11 disbursed throughout the single layer 110.

4. The method of any one of embodiments 1 to 3, wherein the substrate 100 comprises two or more fiber-containing layers 110. See, for example, FIG. 3, which shows two layers 110 with a layer of activated carbon 111 positioned between the two layers 110. It should be understood that, in other embodiments, two layers of activated carbon 111 may be positioned on opposite sides of a single layer 110 of fiber 18, foam or both.

5. The method of any one of embodiments 1 to 4, wherein the substrate 100 comprises one or more nonwoven layers 110, one or more paper layers 110, one or more woven layers 110, one or more knit layers 110, or any combination thereof.

6. The method of any one of embodiments 1 to 5, wherein the substrate 100 comprises one or more nonwoven layers 110.

7. The method of any one of embodiments 1 to 6, wherein the substrate 100 comprises foam (not shown).

8. The method of any one of embodiments 1 to 7, wherein the substrate 100 comprises at least one foam-containing layer 110. See again, for example, FIG. 1, which shows a single layer 110 with activated carbon 11 disbursed throughout the single layer 110.

9. The method of any one of embodiments 1 to 8, wherein the substrate 100 comprises two or more foam-containing layers 110.

10. The method of any one of embodiments 1 to 9, wherein the substrate 100 comprises an outermost fiber-containing layer 110.

11. The method of any one of embodiments 1 to 10, wherein the substrate 100 comprises an outermost foam-containing layer 110.

12. The method of any one of embodiments 1 to 10, wherein the substrate 100 comprises an outermost non-penetrable layer 112 (e.g., one that a needle cannot push thru such as a hard plastic layer, a film layer, an epoxy layer, a metal layer, etc.). See, for example, substrate 100 shown in FIGS. 3, 5 and 7. Suitable outermost non-penetrable film layers 112 include, but are not limited to, liquid impermeable polyethylene film, liquid impermeable polypropylene film, etc.

13. The method of any one of embodiments 1 to 12, wherein the activated carbon 11 is present as a layer of activated carbon 111. See, for example, substrate 100 shown in FIGS. 2-7.

14. The method of any one of embodiments 1 to 13, wherein the activated carbon 11 is present as a layer of activated carbon 111 extending along an outer surface 120 of the substrate 100. See, for example, substrate 100 shown in FIGS. 2 and 4.

15. The method of any one of embodiments 1 to 14, wherein the activated carbon 11 is present as a layer of activated carbon 111 extending within the substrate 100 and positioned a distance from opposite major outer surfaces 120/121 of the substrate 100. See, for example, substrate 100 shown in FIGS. 3-5.

16. The method of any one of embodiments 1 to 15, wherein the activated carbon 11 is present as two or more layers of activated carbon 111. See, for example, substrate 100 shown in FIG. 4.

17. The method of any one of embodiments 1 to 16, wherein the activated carbon 11 is present within two or more layers 110/111/112 of the substrate 100.

18. The method of any one of embodiments 1 to 17, wherein the activated carbon 11 is present within (i) one or more fiber-containing layers 110, (ii) one or more foam-containing layers 110, or (iii) both one or more fiber-containing layers 110 and one or more foam-containing layers 110 of the substrate 100.

19. The method of any one of embodiments 1 to 18, wherein the activated carbon 11 is not present within at least one layer 110/112 of the substrate 100.

20. The method of any one of embodiments 1 to 19, wherein the substrate 100 further comprises (c) (i) a gelling agent (not shown), (ii) superabsorbent particles 19, or (iii) both a gelling agent and superabsorbent particles 19. See, for example, substrate 100 shown in FIGS. 3 and 6-7. Suitable gelling agents include, but are not limited to, acacia, alginic acid, bentonite, carbomers, carboxymethyl cellulose, ethylcellulose, gelatin, hydroxyethyl cellulose, hydroxypropyl cellulose, magnesium aluminum silicate, methylcellulose, poloxamers, polyvinyl alcohol, sodium alginate, tragacanth, and xanthan gum. Suitable superabsorbent particles 19 include, but are not limited to, superabsorbent particles used in diapers. See, for example, superabsorbent particles described in U.S. Pat. No. 4,076,663 issued Feb. 28, 1978 to Masuda et al.; U.S. Pat. No. 4,286,082 issued Aug. 25, 1981 to Tsubakimoto et al.; U.S. Pat. No. 4,062,817 issued Dec. 13, 1977 to Westerman; U.S. Pat. No. 4,340,706 issued Jul. 20, 1982 to Obayashi et al.; and U.S. Pat. No. 6,646,179 issued Nov. 11, 2003 to Melius et al. Suitable commercially available superabsorbent materials include, but are not limited to, superabsorbent materials available from Evonik Industries (Greensboro, N.C.) and Dow Chemical (Midland, Mich.).

21. The method of embodiment 20, wherein the gelling agent is present as a layer of gelling agent 114.

22. The method of embodiment 20 or 21, wherein the gelling agent is present as a layer of gelling agent 114 extending along an outer surface 120/121/122/123 of the substrate 100.

23. The method of any one of embodiments 20 to 22, wherein the gelling agent is present as a layer of gelling agent 114 extending within the substrate 100 and positioned a distance from opposite major outer surfaces 120/121 of the substrate 100.

24. The method of any one of embodiments 20 to 23, wherein the gelling agent is present as two or more layers of gelling agent 114.

25. The method of any one of embodiments 20 to 24, wherein the gelling agent is present within two or more layers 110/111/112/114 of the substrate 100.

26. The method of any one of embodiments 20 to 25, wherein the gelling agent is present within (i) one or more fiber-containing layers 110, (ii) one or more foam-containing layers 110, or (iii) both one or more fiber-containing layers 110 and one or more foam-containing layers 110 of the substrate 100.

27. The method of any one of embodiments 20 to 26, wherein the gelling agent extends along one or more outer surfaces 120/121/122/123 of the substrate 100. See, outer surfaces 120/121/122/123 of substrate 100 shown in FIG. 5.

28. The method of any one of embodiments 20 to 27, wherein the gelling agent extends along all outer surfaces 120/122/123 of the substrate 100 except an upper surface 121.

29. The method of any one of embodiments 20 to 28, wherein the superabsorbent particles 19 are present as a layer of superabsorbent particles 114. See, for example, substrate 100 shown in FIGS. 3 and 6-7.

30. The method of any one of embodiments 20 to 29, wherein the superabsorbent particles 19 are present as a layer of superabsorbent particles 114 extending along an outer surface 120/121/122/123 of the substrate 100.

31. The method of any one of embodiments 20 to 30, wherein the superabsorbent particles 19 are present as a layer of superabsorbent particles 114 extending within the substrate 100 and positioned a distance from opposite major outer surfaces 120/121 of the substrate 100. See again, for example, substrate 100 shown in FIGS. 6-7.

32. The method of any one of embodiments 20 to 31, wherein the superabsorbent particles 19 are present as two or more layers 114 of superabsorbent particles.

33. The method of any one of embodiments 20 to 32, wherein the superabsorbent particles 19 are present within two or more layers 110/111/112/114 of the substrate 100.

34. The method of any one of embodiments 20 to 33, wherein the superabsorbent particles 19 are present within (i) one or more fiber-containing layers 110, (ii) one or more foam-containing layers 110, or (iii) both one or more fiber-containing layers 110 and one or more foam-containing layers 110 of the substrate 100.

35. The method of any one of embodiments 20 to 34, wherein the superabsorbent particles 19 extend along one or more outer surfaces 120/121/122/123 of the substrate 100.

36. The method of any one of embodiments 20 to 35, wherein the superabsorbent particles 19 extend along all outer surfaces 120/122/123 of the substrate 100 except an upper surface 121.

37. The method of any one of embodiments 20, 29 and 31, wherein (i) the superabsorbent particles are present as a layer of superabsorbent particles extending within the substrate and positioned a distance from opposite major outer surfaces of the substrate, (ii) the activated carbon is present as two layers of the activated carbon, and (iii) the substrate comprises an outermost fiber-containing layer. See again, for example, substrate 100 shown in FIGS. 6-7.

38. The method of embodiment 37, wherein the two layers of the activated carbon are positioned along opposite sides of the layer of superabsorbent particles. It should be understood that the two layers of the activated carbon may be positioned (1) along opposite sides of and adjacent to the layer of superabsorbent particles, or (2) along opposite sides of but not adjacent to the layer of superabsorbent particles.

39. The method of embodiment 38 or 39, wherein the two layers of the activated carbon and the layer of superabsorbent particles are bonded to one another with the layer of superabsorbent particles being sandwiched between the two layers of the activated carbon.

40. The method of any one of embodiments 37 to 39, wherein the substrate comprises two outermost fiber-containing layers with one outermost fiber-containing layer being positioned along opposite major outer surfaces of the substrate.

41. The method of embodiment 40, wherein each of the two outermost fiber-containing layers comprises a nonwoven layer.

42. The method of any one of embodiments 37 to 39, wherein the substrate comprises an outermost non-penetrable layer positioned along an opposite major outer surface from said outermost fiber-containing layer of the substrate. See, for example, substrate 100 shown in FIG. 6.

43. The method of embodiment 42, wherein (i) the outermost non-penetrable layer comprises a film layer, and (ii) the outermost fiber-containing layer comprises a nonwoven layer. See, for example, substrate 100 shown in FIG. 7.

44. The method of any one of embodiments 1 to 43, wherein the substrate 100 comprises from two to eight fiber-containing layers 110.

45. The method of any one of embodiments 1 to 44, wherein the substrate 100 comprises from two to eight nonwoven layers 110.

46. The method of any one of embodiments 6 to 45, wherein each nonwoven layer 110 (1) independently comprises polymeric fibers (e.g., polypropylene fibers), cellulosic fibers (e.g., wood pulp fibers), or any combinations thereof, and (2) independently has a basis weight of from about 10.0 grams per square meter (gsm) to about 180.0 gsm. It should be understood that each nonwoven layer 110 may (1) independently comprise polypropylene fibers or any other polymeric fibers, wood pulp fibers, or a combination of polymeric fibers with or without wood pulp fibers, and (2) independently have a basis weight of from about 10.0 gsm to about 180.0 gsm, or any basis weight between 10.0 gsm and 180.0 gsm, in increments of 0.1 gsm (e.g., 18.0 gsm or 20.0 gsm or 45.5 gsm or from about 11.0 gsm to about 150 gsm or from about 20 gsm to about 175 gsm).

Figure 7:
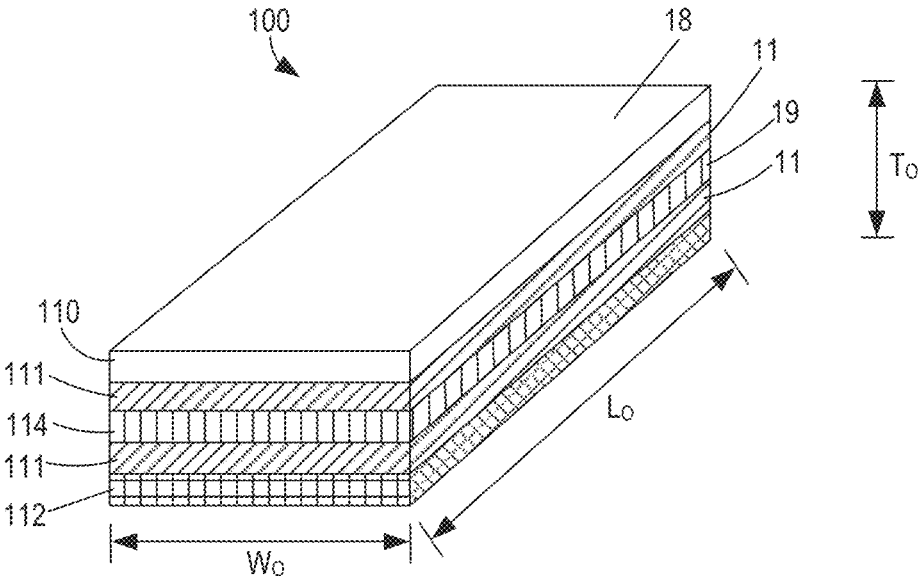
FIG. 7 depicts a perspective view of another exemplary substrate suitable for use in pharmaceutical disposal kits of the present invention.
Figure 7A:
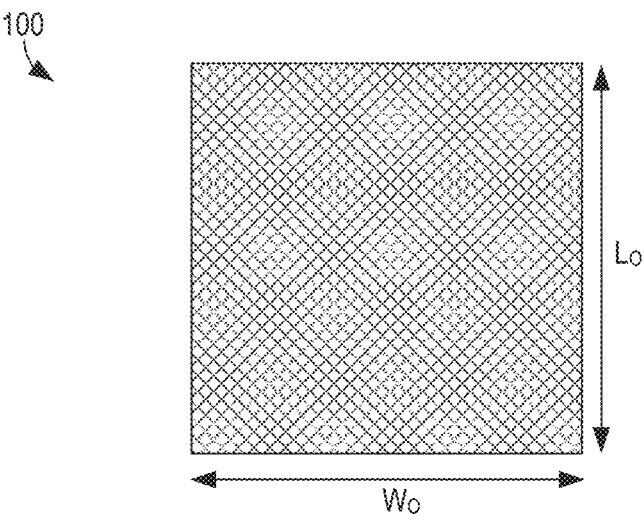
FIGS. 7A-7D depict top and detailed views of other exemplary substrates of the present invention.
Figure 7B:
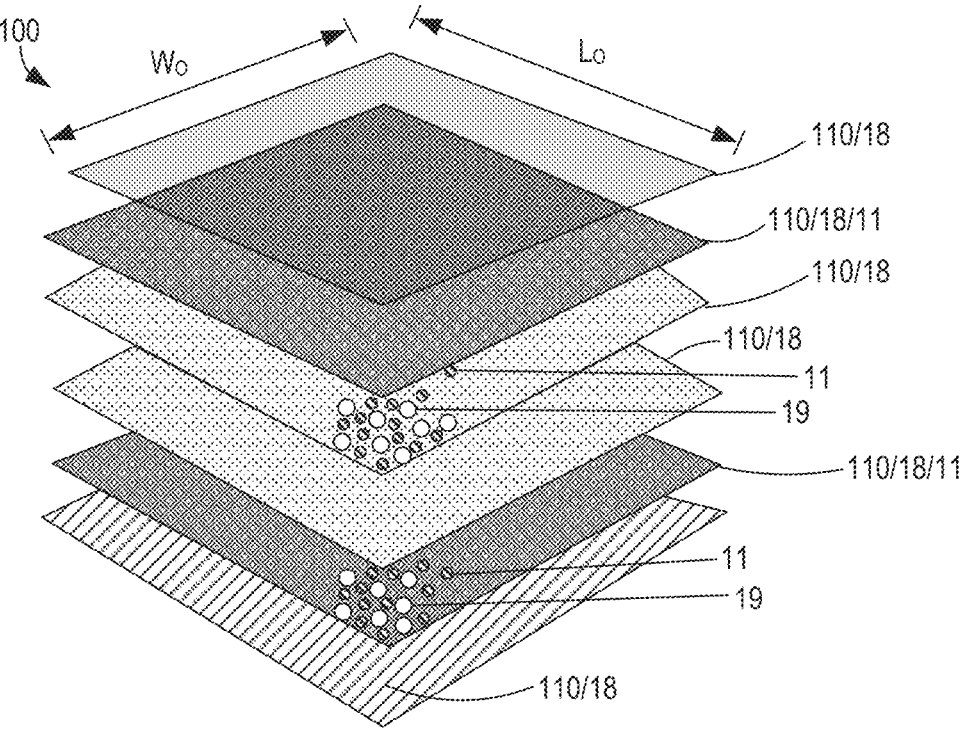

47. The method of any one of embodiments 6 to 46, wherein the substrate 100 comprises (a) at least one nonwoven layer 110 that independently comprises polypropylene fibers, and independently has a basis weight of from about 11.0 gsm to about 150.0 gsm, preferably, about 18.0 gsm, (b) at least one nonwoven layer 110 that independently comprises wood pulp fibers, and independently has a basis weight of from about 20.0 gsm to about 175.0 gsm, preferably, about 172.0 gsm, or (c) both (a) and (b). See, for example, exemplary substrates 100 shown in FIGS. 7B and 7D, wherein in some embodiments, innermost nonwoven layers 110 positioned between activated carbon-containing nonwoven layer 110 comprise (b) nonwoven layers 110 that each independently comprise wood pulp fibers, and independently have a basis weight of from about 20.0 gsm to about 175.0 gsm, preferably, about 172.0 gsm, and outermost nonwoven layers 110 positioned along opposite major surfaces comprise (a) nonwoven layers 110 that each independently comprise polypropylene fibers, and independently have a basis weight of from about 11.0 gsm to about 150.0 gsm, preferably, about 18.0 gsm.

48. The method of any one of embodiments 1 to 47, wherein the substrate 100 comprises from two to six layers containing activated carbon 111.

49. The method of any one of embodiments 1 to 48, wherein the substrate 100 comprises four layers containing activated carbon 111. See, for example, substrate 100 shown in FIGS. 7A-7D.

50. The method of any one of embodiments 1 to 49, wherein the substrate 100 comprises (i) at least one layer containing activated carbon 111 in combination with fibers, and (ii) at least one layer containing activated carbon 111 but no fibers.

51. The method of any one of embodiments 1 to 50, wherein the substrate 100 comprises (i) at least two layers containing activated carbon 111 in combination with fibers, and (ii) at least two layers containing activated carbon 111 but no fibers.

52. The method of any one of embodiments 1 to 51, wherein the substrate 100 comprises from two to six layers containing superabsorbent particles 114.

53. The method of any one of embodiments 1 to 52, wherein the substrate 100 comprises from two to three layers containing superabsorbent particles 114. See again, for example, substrate 100 shown in FIGS. 7A-7D.

54. The method of any one of embodiments 20 to 53, wherein the substrate 100 comprises at least one layer containing a mixture of activated carbon 11 and superabsorbent particles 19. See again, for example, substrate 100 shown in FIGS. 7A-7D.

55. The method of any one of embodiments 20 to 54, wherein the substrate 100 comprises at least two layers containing a mixture of activated carbon 11 and superabsorbent particles 19. See again, for example, substrate 100 shown in FIGS. 7A-7D.

56. The method of any one of embodiments 20 to 55, wherein the substrate 100 comprises at least one layer comprising (or consisting of) superabsorbent particles 19. See, for example, substrate 100 shown in FIGS. 7C-7D.

57. The method of any one of embodiments 20 to 56, wherein the substrate 100 comprises (a) two outermost nonwoven layers 110, (b) two nonwoven layers containing activated carbon adjacent to and between the two outermost nonwoven layers 110, and (c) at least one layer containing a mixture of activated carbon 11 and superabsorbent particles 19 between the two nonwoven layers containing activated carbon.

58. The method of any one of embodiments 20 to 57, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, and (d) at least one nonwoven layer positioned between the two layers containing a mixture of activated carbon 11 and superabsorbent particles 19.

59. The method of any one of embodiments 20 to 58, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, and (d) two interior nonwoven layers positioned between the two layers containing a mixture of activated carbon 11 and superabsorbent particles 19.

60. The method of any one of embodiments 20 to 59, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, (d) two interior nonwoven layers positioned between the two layers containing a mixture of activated carbon 11 and superabsorbent particles 19, and (e) a layer comprising (or consisting of) superabsorbent particles 19 positioned between the two interior nonwoven layers. See again, for example, substrate 100 shown in FIGS. 7C-7D.

Figure 7C:
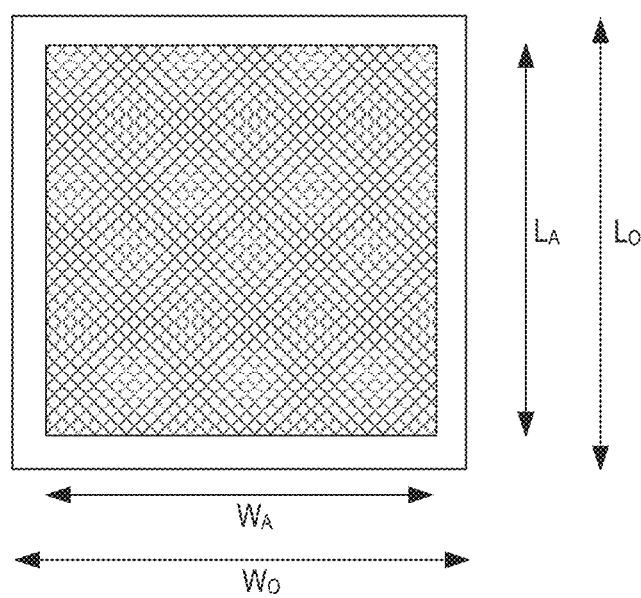
Figure 7D:
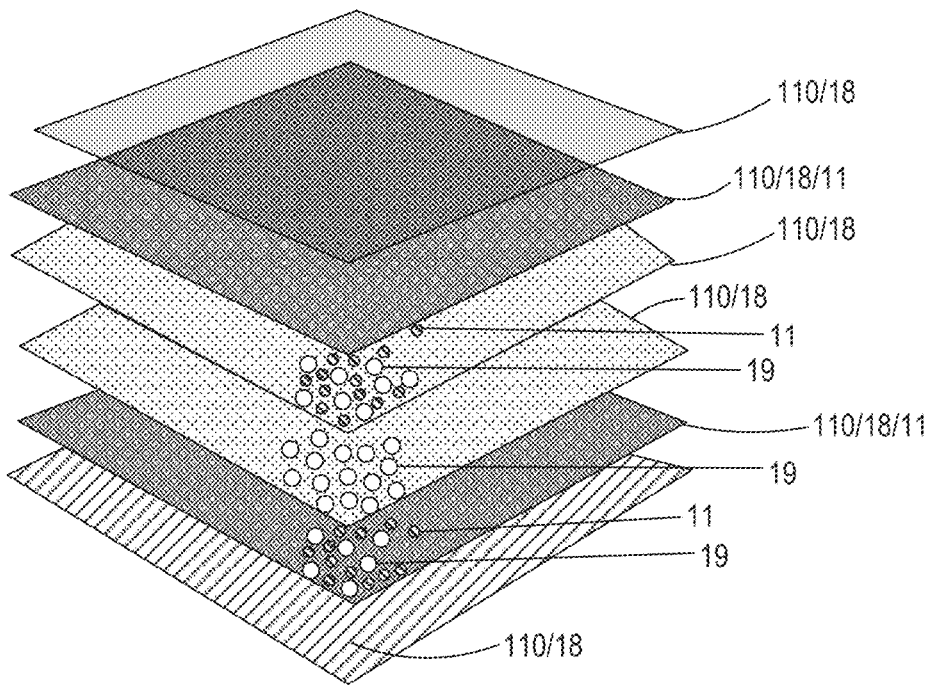
Figure 8A:
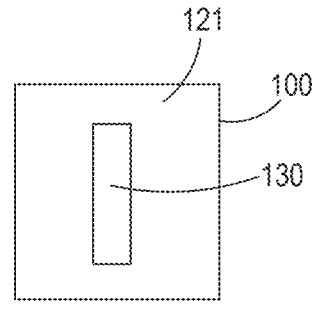
FIGS. 8A and 8B depict top views of another exemplary substrate with a color change stripe thereon, with one color change stripe having no color (FIG. 8A) and the other color change stripe having a visible color (FIG. 8B) after effective amount of liquid is added to the substrate.
Figure 8B:
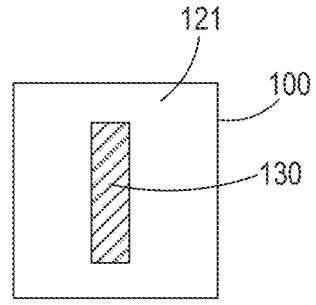
Figure 9A:
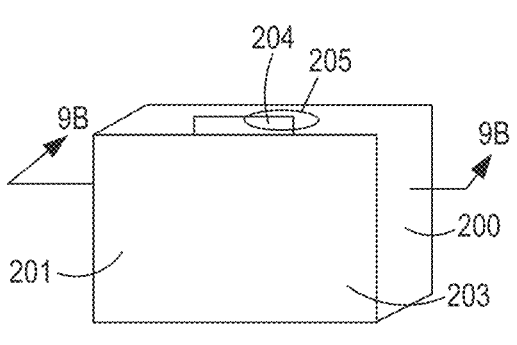
FIG. 9A depicts an exemplary container suitable for use in pharmaceutical disposal kits of the present invention.
Figure 9B:
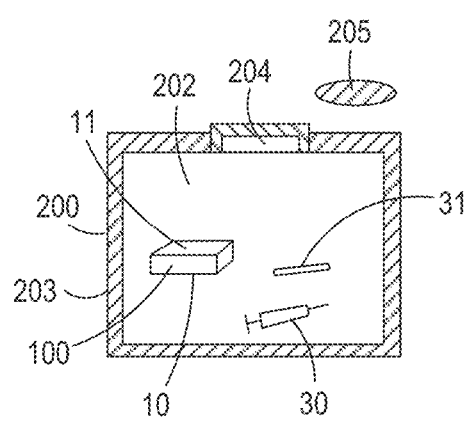
FIG. 9B depicts a cross-sectional view of the exemplary container shown in FIG. 9A as viewed along line 9B-9B shown in FIG. 9A.
Figure 10:
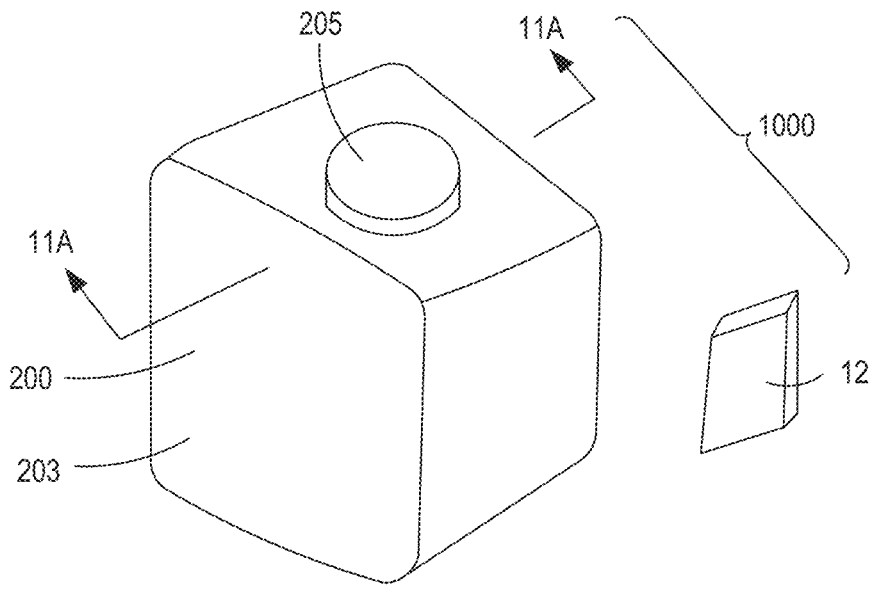
FIG. 10 depicts a perspective view of another exemplary pharmaceutical and/or sharps disposal kit of the present invention.

61. The method of any one of embodiments 1 to 60, wherein the substrate 100 has an overall length Lo ranging from about 3.0 inches (in) to about 48.0 in, an overall width $W_O$ ranging from about 1.0 in to about 48.0 in, and an overall thickness $T_O$ ranging from about 0.10 in to about 1.0 in. As shown in FIG. 7C, in some embodiments, substrate 100 has an "active" pad area that is less than an overall area of substrate 100, with the "active" pad area designating a pad area within which is (i) activated carbon 11 and/or superabsorbent particles 19. As shown in FIG. 7C, exemplary substrate 100 has an "active" pad area with an active area length $L_A$, and an active area width $W_A$, 62. The method of any one of embodiments 1 to 61, wherein the substrate 100 has an overall length $L_O$ ranging from about 3.0 in to about 12.0 in, an overall width $W_O$ ranging from about 9.0 in to about 12.0 in, and an overall thickness $T_O$ ranging from about 0.15 in to about 0.5 in.

63. The method of any one of embodiments 1 to 62, wherein the substrate 100 further comprises a stripe 130 that undergoes a color change when exposed to a color-changing liquid. See, for example, substrate 100 shown in FIGS. 6A-6B.

64. The method of embodiment 63, wherein the color-changing liquid is water.

65. The method of embodiment 63, wherein the color-changing liquid is the one or more liquid pharmaceuticals 10.

66. The method of any one of embodiments 63 to 65, wherein said depositing step causes the stripe of the stripe 130 to undergo a color change.

67. The method of any one of embodiments 1 to 66, further comprising positioning the substrate 100 proximate to, on, or within a container 200. See, exemplary container 200 shown in FIGS. 9A and 9B.

68. The method of any one of embodiments 1 to 67, further comprising positioning the substrate 100 proximate to a container 200.

69. The method of any one of embodiments 1 to 68, further comprising positioning the substrate 100 on a container 200. For example, substrate 100 may be adhesively attached to an outer surface 201 of container 200 via an adhesive layer 115 (see FIG. 3). It should be understood that any method or means of attaching substrate 100 to an outer surface 201 of container 200 may be utilized. After use, substrate 100 may be removed from outer surface 201 of container 200 and inputted into a container volume 202 within container 200.

70. The method of any one of embodiments 1 to 69, further comprising positioning the substrate 100 within a container 200.

71. The method of any one of embodiments 67 to 70, wherein the container 100 comprises: a container housing 203 surrounding a container volume 202, a container opening 204 providing access to the container volume 202 from outside the container housing 203, and a movable container housing closure member 205 sized to extend over and cover the container opening 204.

72. The method of any one of embodiments 67 to 71, wherein said method further comprises: depositing one or more syringes 30, one or more needles 31, or any combination thereof into the container 200. As discussed above, after use, substrate 100 (with one or more liquid pharmaceuticals 10 therein or thereon) may be positioned in container volume 202 within container 200.

73. The method of any one of embodiments 1 to 72, wherein said depositing step comprises using a syringe 30 to incorporate the one or more liquid pharmaceuticals 10 into or onto the substrate 100. In other embodiments, the depositing step may comprise pouring the one or more liquid pharmaceuticals 10 onto an upper surface 121 of the substrate 100.

74. The method of any one of embodiments 1 to 73, wherein one or more layers of the substrate 100 comprise (A) an additional absorbent material (not shown), the additional absorbent material comprising (I) naturally-occurring absorbent materials such as (a) naturally-occurring inorganic materials including clay, sand, and volcanic ash cotton fibers, (b) naturally-occurring organic materials including cotton fibers, (II) synthetic absorbent materials such as polymer sponges, and other hydrophilic materials, or both (I) and (II), (B) a material (not shown) that (i) binds or chemically alters the liquid pharmaceuticals 10 (or dissolved solid pharmaceuticals 20 in, e.g., water) and (ii) deters or prevents recovery of the liquid pharmaceuticals 10 (or dissolved solid pharmaceuticals 20 in, e.g., water), or (C) both (A) and (B). For example, (a) one or more additional absorbent materials (not shown), (b) one or more materials (not shown) that (i) bind or chemically alter the liquid pharmaceuticals 10 (or dissolved solid pharmaceuticals 20 in, e.g., water) and (ii) deter or prevent recovery of the liquid pharmaceuticals 10 (or dissolved solid pharmaceuticals 20 in, e.g., water), or (c) both (a) and (b) could be present in any one or all of: (i) the one or more fiber-containing layers 110, (ii) the one or more layers containing activated carbon 111, (iii) the one or more layers containing superabsorbent particles 114, or (iv) any combination of (i), (ii) and (iii).

75. The method of any one of embodiments 1 to 74, wherein the substrate 100 comprises from about 0.5 grams (g) to about 100.0 g of the activated carbon 11 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

76. The method of any one of embodiments 1 to 75, wherein the substrate 100 comprises from about 1.2 g to about 12.0 g of the activated carbon 11.

77. The method of any one of embodiments 20 to 76, wherein the substrate 100 comprises from about 0.5 grams (g) to about 100.0 g of the superabsorbent particles 19 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

78. The method of any one of embodiments 20 to 77, wherein the substrate 100 comprises from about 1.2 g to about 12.0 g of the superabsorbent particles 19.

Pharmaceutical Disposal Kits

79. A pharmaceutical disposal kit 1000 suitable for use in the method of any one of embodiments 1 to 78, said kit 1000 comprising: the substrate 100 comprising (a)(i) fibers 18, (ii) foam, or (iii) both fibers 18 and foam, and (b) activated carbon 11.

80. A pharmaceutical disposal kit 1000 comprising: a substrate 100 comprising (a)(i) fibers 18, (ii) foam (not shown), or (iii) both fibers 18 and foam, and (b) activated carbon 11.

81. The pharmaceutical disposal kit 1000 of embodiment 79 or 80, wherein the substrate 100 comprises fibers 18.

82. The pharmaceutical disposal kit 1000 of any one of embodiments 79 to 81, wherein the substrate 100 comprises at least one fiber-containing layer 110.

83. The pharmaceutical disposal kit 1000 of any one of embodiments 79 to 82, wherein the substrate 100 comprises two or more fiber-containing layers 110.

84. The pharmaceutical disposal kit 1000 of any one of embodiments 79 to 83, wherein the substrate 100 comprises one or more nonwoven layers 110, one or more paper layers 110, one or more woven layers 110, one or more knit layers 110, or any combination thereof.

85. The pharmaceutical disposal kit 1000 of any one of embodiments 79 to 84, wherein said substrate 100 comprises one or more nonwoven layers 110.

86. The pharmaceutical disposal kit 1000 of any one of embodiments 79 to 85, wherein said substrate 100 comprises foam (not shown).

87. The pharmaceutical disposal kit 1000 of any one of embodiments 79 to 86, wherein said substrate 100 comprises at least one foam-containing layer 110.

88. The pharmaceutical disposal kit 1000 of any one of embodiments 79 to 87, wherein said substrate 100 comprises two or more foam-containing layers 110.

89. The pharmaceutical disposal kit 1000 of any one of embodiments 79 to 88, wherein said substrate 100 comprises an outermost fiber-containing layer 110.

90. The pharmaceutical disposal kit 1000 of any one of embodiments 79 to 89, wherein said substrate 100 comprises an outermost foam-containing layer 110.

91. The pharmaceutical disposal kit 1000 of any one of embodiments 79 to 89, wherein said substrate 100 comprises an outermost non-penetrable layer 112 (e.g., one that a needle cannot push thru, for example, a film layer, a liquid impermeable polymer film layer, an epoxy layer, a metal layer, a hard plastic layer, or combinations thereof).

92. The pharmaceutical disposal kit 1000 of any one of embodiments 79 to 91, wherein the activated carbon 11 is present as a layer of activated carbon 111. As shown in FIG. 1, alternatively, the activated carbon 11 may be disbursed throughout a layer containing other substrate components such as fibers 18, foam or both.

93. The pharmaceutical disposal kit 1000 of any one of embodiments 79 to 92, wherein the activated carbon 11 is present as a layer of activated carbon 111 extending along an outer surface 120/121/122/123 of said substrate 100.

94. The pharmaceutical disposal kit 1000 of any one of embodiments 79 to 92, wherein the activated carbon 11 is present as a layer of activated carbon 111 extending within said substrate 100 and positioned a distance from opposite major outer surfaces 120/121 of said substrate 100.

95. The pharmaceutical disposal kit 1000 of any one of embodiments 79 to 94, wherein the activated carbon 11 is present as two or more layers of activated carbon 111.

96. The pharmaceutical disposal kit 1000 of any one of embodiments 79 to 95, wherein the activated carbon 11 is present within two or more layers 110/111/112 of the substrate 100.

97. The pharmaceutical disposal kit 1000 of any one of embodiments 79 to 96, wherein the activated carbon 11 is present within (i) one or more fiber-containing layers 110, (ii) one or more foam-containing layers 110, or (iii) both one or more fiber-containing layers 110 and one or more foam-containing layers 110 of the substrate 100.

98. The pharmaceutical disposal kit 1000 of any one of embodiments 79 to 97, wherein the activated carbon 11 is not present within at least one layer 110/112 of the substrate 100.

99. The pharmaceutical disposal kit 1000 of any one of embodiments 79 to 98, wherein the substrate 100 further comprises (c) (i) a gelling agent (not shown), (ii) superabsorbent particles 19, or (iii) both a gelling agent and superabsorbent particles 19. It should be understood that other absorbent materials may be used in combination with, or instead of, the superabsorbent particles 19. Other absorbent materials include both (I) naturally-occurring absorbent materials such as (a) naturally-occurring inorganic materials such as clay, sand, and volcanic ash cotton fibers, (b) naturally-occurring organic materials such as cotton fibers, and (II) synthetic absorbent materials such as polymer sponges, other hydrophilic materials.

100. The pharmaceutical disposal kit 1000 of embodiment 99, wherein the gelling agent is present as a layer of gelling agent 114.

101. The pharmaceutical disposal kit 1000 of embodiment 99 or 100, wherein the gelling agent is present as a layer of gelling agent 114 extending along an outer surface 120/121/122/123 of said substrate 100.

102. The pharmaceutical disposal kit 1000 of any one of embodiments 99 to 101, wherein the gelling agent is present as a layer of gelling agent 114 extending within the substrate 100 and positioned a distance from opposite major outer surfaces 120/121 of the substrate 100.

103. The pharmaceutical disposal kit 1000 of any one of embodiments 99 to 102, wherein the gelling agent is present as two or more layers of gelling agent 114.

104. The pharmaceutical disposal kit 1000 of any one of embodiments 99 to 103, wherein the gelling agent is present within two or more layers 110/111/112/114 of the substrate 100.

105. The pharmaceutical disposal kit 1000 of any one of embodiments 99 to 104, wherein the gelling agent is present within (i) one or more fiber-containing layers 110, (ii) one or more foam-containing layers 110, or (iii) both one or more fiber-containing layers 110 and one or more foam-containing layers 110 of the substrate 100.

106. The pharmaceutical disposal kit 1000 of any one of embodiments 99 to 105, wherein the gelling agent extends along one or more outer surfaces 120/121/122/123 of the substrate 100.

107. The pharmaceutical disposal kit 1000 of any one of embodiments 99 to 106, wherein the gelling agent extends along all outer surfaces 120/122/123 of the substrate 100 except an upper surface 121.

108. The pharmaceutical disposal kit 1000 of any one of embodiments 99 to 107, wherein the superabsorbent particles 19 are present as a layer of superabsorbent particles 114.

109. The pharmaceutical disposal kit 1000 of any one of embodiments 99 to 108, wherein the superabsorbent particles 19 are present as a layer of superabsorbent particles 114 extending along an outer surface 120/121/122/123 of said substrate 100.

110. The pharmaceutical disposal kit 1000 of any one of embodiments 99 to 109, wherein the superabsorbent particles 19 are present as a layer of superabsorbent particles 114 extending within the substrate 100 and positioned a distance from opposite major outer surfaces 120/121 of the substrate 100.

111. The pharmaceutical disposal kit 1000 of any one of embodiments 99 to 110, wherein the superabsorbent particles 19 are present as two or more layers of superabsorbent particles 114.

112. The pharmaceutical disposal kit 1000 of any one of embodiments 99 to 111, wherein the superabsorbent particles 19 are present within two or more layers 110/111/112/114 of the substrate 100.

113. The pharmaceutical disposal kit 1000 of any one of embodiments 99 to 112, wherein the superabsorbent particles 19 are present within (i) one or more fiber-containing layers 110, (ii) one or more foam-containing layers 110, or (iii) both one or more fiber-containing layers 110 and one or more foam-containing layers 110 of the substrate 100.

114. The pharmaceutical disposal kit 1000 of any one of embodiments 99 to 113, wherein the superabsorbent particles 19 extend along one or more outer surfaces 120/121/122/123 of the substrate 100.

115. The pharmaceutical disposal kit 1000 of any one of embodiments 99 to 114, wherein the superabsorbent particles 19 extend along all outer surfaces 120/122/123 of the substrate 100 except an upper surface 121.

116. The pharmaceutical disposal kit 1000 of any one of embodiments 78, 110 and 113, wherein (i) the superabsorbent particles are present as a layer of superabsorbent particles extending within the substrate and positioned a distance from opposite major outer surfaces of the substrate, (ii) the activated carbon is present as two layers of the activated carbon, and (iii) the substrate comprises an outermost fiber-containing layer. See again, for example, substrate 100 shown in FIGS. 6-7.

117. The pharmaceutical disposal kit 1000 of embodiment 116, wherein the two layers of the activated carbon are positioned along opposite sides of the layer of superabsorbent particles.

118. The pharmaceutical disposal kit 1000 of embodiment 116 or 117, wherein the two layers of the activated carbon and the layer of superabsorbent particles are bonded to one another with the layer of superabsorbent particles being sandwiched between the two layers of the activated carbon.

119. The pharmaceutical disposal kit 1000 of any one of embodiments 116 to 118, wherein the substrate comprises two outermost fiber-containing layers with one outermost fiber-containing layer being positioned along opposite major outer surfaces of the substrate.

120. The pharmaceutical disposal kit 1000 of embodiment 119, wherein each of the two outermost fiber-containing layers comprises a nonwoven layer.

121. The pharmaceutical disposal kit 1000 of any one of embodiments 116 to 118, wherein the substrate comprises an outermost non-penetrable layer positioned along an opposite major outer surface from said outermost fiber-containing layer of the substrate. See, for example, substrate 100 shown in FIG. 6.

122. The pharmaceutical disposal kit 1000 of embodiment 121, wherein (i) the outermost non-penetrable layer comprises a film layer, and (ii) the outermost fiber-containing layer comprises a nonwoven layer. See, for example, substrate 100 shown in FIG. 7.

123. The pharmaceutical disposal kit 1000 of any one of embodiments 79 to 122, wherein the substrate 100 comprises from two to eight fiber-containing layers 110.

124. The pharmaceutical disposal kit 1000 of any one of embodiments 79 to 123, wherein the substrate 100 comprises from two to eight nonwoven layers 110.

125. The pharmaceutical disposal kit 1000 of any one of embodiments 85 to 124, wherein each nonwoven layer 110 (1) independently comprises polymeric fibers (e.g., polypropylene fibers), cellulosic fibers (e.g., wood pulp fibers), or any combinations thereof, and (2) independently has a basis weight of from about 10.0 gsm to about 180.0 gsm. As noted above, each nonwoven layer 110 may (1) independently comprise polypropylene fibers or any other polymeric fibers, wood pulp fibers, or a combination of polymeric fibers with or without wood pulp fibers, and (2) independently have a basis weight of from about 10.0 gsm to about 180.0 gsm, or any basis weight between 10.0 gsm and 180.0 gsm, in increments of 0.1 gsm (e.g., 18.0 gsm or 20.0 gsm or 45.5 gsm or from about 11.0 gsm to about 150 gsm or from about 20 gsm to about 175 gsm).

126. The pharmaceutical disposal kit 1000 of any one of embodiments 85 to 125, wherein the substrate 100 comprises (a) at least one nonwoven layer 110 that independently comprises polypropylene fibers, and independently has a basis weight of from about 11.0 gsm to about 150.0 gsm, preferably, about 18.0 gsm, (b) at least one nonwoven layer 110 that independently comprises wood pulp fibers, and independently has a basis weight of from about 20.0 gsm to about 175.0 gsm, preferably, about 172.0 gsm, or (c) both (a) and (b). See again, for example, exemplary substrates 100 shown in FIGS. 7B and 7D, wherein in some embodiments, innermost nonwoven layers 110 positioned between activated carbon-containing nonwoven layer 110 comprise (b) nonwoven layers 110 that each independently comprise wood pulp fibers, and independently have a basis weight of from about 20.0 gsm to about 175.0 gsm, preferably, about 172.0 gsm, and outermost nonwoven layers 110 positioned along opposite major surfaces comprise (a) nonwoven layers 110 that each independently comprise polypropylene fibers, and independently have a basis weight of from about 11.0 gsm to about 150.0 gsm, preferably, about 18.0 gsm.

127. The pharmaceutical disposal kit 1000 of any one of embodiments 79 to 126, wherein the substrate 100 comprises from two to six layers containing activated carbon 111.

128. The pharmaceutical disposal kit 1000 of any one of embodiments 79 to 127, wherein the substrate 100 comprises four layers containing activated carbon 111. See, for example, substrate 100 shown in FIGS. 7A-7D.

129. The pharmaceutical disposal kit 1000 of any one of embodiments 79 to 128, wherein the substrate 100 comprises (i) at least one layer containing activated carbon 111 in combination with fibers, and (ii) at least one layer containing activated carbon 111 but no fibers.

130. The pharmaceutical disposal kit 1000 of any one of embodiments 79 to 129, wherein the substrate 100 comprises (i) at least two layers containing activated carbon 111 in combination with fibers, and (ii) at least two layers containing activated carbon 111 but no fibers.

131. The pharmaceutical disposal kit 1000 of any one of embodiments 79 to 130, wherein the substrate 100 comprises from two to six layers containing superabsorbent particles 114.

132. The pharmaceutical disposal kit 1000 of any one of embodiments 79 to 131, wherein the substrate 100 comprises from two to three layers containing superabsorbent particles 114. See again, for example, substrate 100 shown in FIGS. 7A-7D.

133. The pharmaceutical disposal kit 1000 of any one of embodiments 99 to 132, wherein the substrate 100 comprises at least one layer containing a mixture of activated carbon 11 and superabsorbent particles 19. See again, for example, substrate 100 shown in FIGS. 7A-7D.

134. The pharmaceutical disposal kit 1000 of any one of embodiments 99 to 133, wherein the substrate 100 comprises at least two layers containing a mixture of activated carbon 11 and superabsorbent particles 19. See again, for example, substrate 100 shown in FIGS. 7A-7D.

135. The pharmaceutical disposal kit 1000 of any one of embodiments 99 to 134, wherein the substrate 100 comprises at least one layer comprising (or consisting of) superabsorbent particles 19. See, for example, substrate 100 shown in FIGS. 7C-7D.

136. The pharmaceutical disposal kit 1000 of any one of embodiments 99 to 135, wherein the substrate 100 comprises (a) two outermost nonwoven layers 110, (b) two nonwoven layers containing activated carbon adjacent to and between the two outermost nonwoven layers 110, and (c) at least one layer containing a mixture of activated carbon 11 and superabsorbent particles 19 between the two nonwoven layers containing activated carbon.

137. The pharmaceutical disposal kit 1000 of any one of embodiments 99 to 136, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, and (d) at least one nonwoven layer positioned between the two layers containing a mixture of activated carbon 11 and superabsorbent particles 19.

138. The pharmaceutical disposal kit 1000 of any one of embodiments 99 to 137, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, and (d) two interior nonwoven layers positioned between the two layers containing a mixture of activated carbon 11 and superabsorbent particles 19.

139. The pharmaceutical disposal kit 1000 of any one of embodiments 99 to 138, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, (d) two interior nonwoven layers positioned between the two layers containing a mixture of activated carbon 11 and superabsorbent particles 19, and (e) a layer comprising (or consisting of) superabsorbent particles 19 positioned between the two interior nonwoven layers. See again, for example, substrate 100 shown in FIGS. 7C-7D.

140. The pharmaceutical disposal kit 1000 of any one of embodiments 79 to 139, wherein the substrate 100 has an overall length Lo ranging from about 3.0 inches (in) to about 48.0 in, an overall width $W_O$ ranging from about 1.0 in to about 48.0 in, and an overall thickness $T_O$ ranging from about 0.10 in to about 1.0 in.

141. The pharmaceutical disposal kit 1000 of any one of embodiments 79 to 140, wherein the substrate 100 has an overall length Lo ranging from about 3.0 in to about 12.0 in, an overall width $W_O$ ranging from about 9.0 in to about 12.0 in, and an overall thickness $T_O$ ranging from about 0.15 in to about 0.5 in.

142. The pharmaceutical disposal kit 1000 of any one of embodiments 79 to 141, wherein the substrate 100 further comprises a stripe 130 that undergoes a color change when exposed to a color-changing liquid. It should be understood that stripe 130 may have any shape (e.g., rectangular, square, star-shaped, circular, etc.) and be positioned at any location along substrate 100 (e.g., any outer surface or underneath a clear layer of substrate 100 if present).

143. The pharmaceutical disposal kit 1000 of embodiment 142, wherein the color-changing liquid is water.

144. The pharmaceutical disposal kit 1000 of embodiment 142, wherein the color-changing liquid is the one or more liquid pharmaceuticals 10.

145. The pharmaceutical disposal kit 1000 of any one of embodiments 142 to 144, wherein incorporating one or more liquid pharmaceuticals 10 or dissolved solid pharmaceuticals 20 into or onto the substrate 100 causes the stripe 130 of the substrate 100 to undergo a color change.

146. The pharmaceutical disposal kit 1000 of any one of embodiments 79 to 145, further comprising: a liquid pharmaceutical 10 (or dissolved solid pharmaceuticals 20 in, e.g., water), on or within the substrate 100.

147. The pharmaceutical disposal kit 1000 of any one of embodiments 79 to 146, further comprising: a container 200.

148. The pharmaceutical disposal kit 1000 of any one of embodiments 79 to 147, further comprising: a container 200, wherein the substrate 100 is positioned proximate, on or within the container 200.

149. The pharmaceutical disposal kit 1000 of embodiment 148, wherein the substrate 100 is proximate the container 200.

150. The pharmaceutical disposal kit 1000 of embodiment 148 or 149, wherein the substrate 100 is on the container 200.

151. The pharmaceutical disposal kit 1000 of any one of embodiments 148 to 150, wherein the substrate 100 is within the container 200.

152. The pharmaceutical disposal kit 1000 of any one of embodiments 147 to 151, further comprising: one or more syringes 30, one or more needles 31, or any combination thereof within the container.

153. The pharmaceutical disposal kit 1000 of any one of embodiments 147 to 152, wherein the container 200 comprises: a container housing 203 surrounding a container volume 202, a container opening 204 providing access to the container volume 202 from outside the container housing 203, and a movable container housing closure member 205 sized to extend over and cover the container opening 204. Typically, container volume 202 may be as little as 0.1 gallons up to about ten gallons (or any amount in increments of 0.1 gallons up to 10.0 gallons).

154. A pharmaceutical disposal kit 1000 comprising: a substrate 100 comprising (a)(i) fibers 18, (ii) foam (not shown), or (iii) both fibers and foam, and (b) activated carbon 11; and (c) a container 200 comprising: a container housing 203 surrounding a container volume 202, a container opening 204 providing access to said container volume 202 from outside said container housing 203, and a movable container housing closure member 205 sized to extend over and cover said container opening 204, wherein said substrate 100 is proximate, on or within said container 200.

155. The pharmaceutical disposal kit 1000 of embodiment 154, wherein the substrate 100 is proximate the container 200.

156. The pharmaceutical disposal kit 1000 of embodiment 154 or 155, wherein the substrate 100 is on the container 200.

157. The pharmaceutical disposal kit 1000 of any one of embodiments 154 to 156, wherein the substrate 100 is within the container 200.

158. The pharmaceutical disposal kit 1000 of any one of embodiments 154 to 157, wherein the substrate 100 comprises the substrate 100 described in any one of embodiments 79 to 146.

159. The pharmaceutical disposal kit 1000 of any one of embodiments 154 to 158, wherein the substrate 100 further comprises a stripe 130 that undergoes a color change when exposed to a color-changing liquid.

160. The pharmaceutical disposal kit 1000 of embodiment 159, wherein the color-changing liquid is water.

161. The pharmaceutical disposal kit 1000 of embodiment 159, wherein the color-changing liquid is the one or more liquid pharmaceuticals 10.

162. The pharmaceutical disposal kit 1000 of any one of embodiments 159 to 161, wherein the stripe 130 is positioned along an upper surface 121 of the substrate 100.

163. The pharmaceutical disposal kit 1000 of any one of embodiments 155 to 162, wherein said stripe 130 undergoes a color change when said stripe 130 is contacted with a liquid pharmaceutical 10 or dissolved solid pharmaceuticals 20 in water 14.

164. The pharmaceutical disposal kit 1000 of any one of embodiments 155 to 163, wherein said container 200 further comprises one or more syringes 30, one or more needles 31, or any combination thereof.

165. The pharmaceutical disposal kit 1000 of any one of embodiments 155 to 164, further comprising: a liquid pharmaceutical 10 on or within the substrate 100.

166. The pharmaceutical disposal kit 1000 of any one of embodiments 79 to 165, wherein the substrate 100 further comprises: one or more adhesive layers 115 to enable substrate 100 to be adhered to a surface (e.g., an outer surface 201 of container 200).

167. The pharmaceutical disposal kit 1000 of embodiment 166, wherein the substrate 100 further comprises: a release liner (not shown) over an exposable adhesive layer 115.

168. The pharmaceutical disposal kit 1000 of any one of embodiments 79 to 167, wherein one or more layers of said substrate 100 comprise (A) an additional absorbent material (not shown), the additional absorbent material comprising (I) naturally-occurring absorbent materials such as (a) naturally-occurring inorganic materials including clay, sand, and volcanic ash cotton fibers, (b) naturally-occurring organic materials including cotton fibers, (II) synthetic absorbent materials such as polymer sponges, and other hydrophilic materials, or both (I) and (II), (B) a material (not shown) that (i) binds or chemically alters the liquid pharmaceuticals 10 (or dissolved solid pharmaceuticals 20 in, e.g., water) and (ii) deters or prevents recovery of the liquid pharmaceuticals 10 (or dissolved solid pharmaceuticals 20 in, e.g., water), or (C) both (A) and (B).

169. The pharmaceutical disposal kit 1000 of any one of embodiments 79 to 168, wherein the substrate 100 comprises from about 0.5 grams (g) to about 100.0 g of the activated carbon 11 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

170. The pharmaceutical disposal kit 1000 of any one of embodiments 79 to 169, wherein the substrate 100 comprises from about 1.2 g to about 12.0 g of the activated carbon 11.

171. The pharmaceutical disposal kit 1000 of any one of embodiments 99 to 170, wherein the substrate 100 comprises from about 0.5 grams (g) to about 100.0 g of the superabsorbent particles 19 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

172. The pharmaceutical disposal kit 1000 of any one of embodiments 99 to 171, wherein the substrate 100 comprises from about 1.2 g to about 12.0 g of the superabsorbent particles 19.

It should be understood that although substrate 100 is shown as having one or more layers, as shown in FIGS. 1-7, substrate 100 may further comprise any number of additional layers in addition to those shown in the figures. For example, in some embodiments, any of the above-described substrates 100 may be at least partially, or completely, encased within a permeable outer cover (not shown). The permeable outer cover may comprise a permeable material alone, such as a nonwoven (or woven or knit) fabric layer, or may comprise a combination of a permeable material and an impermeable material. For example, the permeable outer cover may comprise a permeable top/upper layer (e.g., a nonwoven fabric layer) and an impermeable bottom/lower layer (e.g., a nonwoven fabric layer coated and/or impregnated with an impermeable coating/impregnant such as a rubber-based composition, or a rubber or polymeric film layer) with any sides connecting the permeable top/upper layer to the impermeable bottom/lower layer, when present, comprising either a permeable or impermeable material.

Additional Methods of Disposing of Solid Pharmaceuticals

173. A method of disposing of solid pharmaceuticals 20 (e.g., pills, transdermal patches, etc.), said method comprising: partially filling a pill bottle containing discardable (i.e., unused or expired) solid pharmaceuticals 20 with water; and pouring/placing a solidifying composition into the pill bottle 200/200', the solidifying composition comprising (a) activated carbon and (b)(i) a gelling agent (not shown), (ii) superabsorbent particles 19, (iii) a polymerizable composition comprising a first monomeric component 13 that is capable of polymerization when combined with an effective amount of a polymerization initiator 15, or (iv) any combination of (i), (ii), and (iii). Suitable first monomeric components 13 and polymerization initiators 15 include any of those described herein.

174. The method of embodiment 173, wherein the activated carbon is incorporated within the gelling agent. In some embodiments, the gelling agent may be impregnated with activated carbon 11. In some embodiments, the superabsorbent particles 19 may be impregnated with activated carbon 11.

175. The method of embodiment 173 or 174, wherein the solidifying composition further comprises fibers, foam, a fiber-containing mass (e.g., a nonwoven fabric or nonwoven mass such as a cotton/fibrous ball), a foam-containing mass, any of the above-described substrates 100, or any combination thereof.

176. The method of any one of embodiments 173 to 175, further comprising: capping the pill bottle 200/200'; and shaking contents within the pill bottle 200/200'.

177. A method of disposing of liquid/solid pharmaceuticals 10/20, said method comprising: depositing one or more pharmaceuticals 10/20 or the substrate 100 of any one of embodiments 79 to 172 into a container 200 containing (i) a first monomeric component 13 and (ii) water 14, the first monomeric component 13 being capable of polymerization when combined with an effective amount of a polymerization initiator 15.

178. The method of embodiment 177, wherein the first monomeric component 13 comprises an acrylic or acrylamide monomer.

179. The method of embodiment 177 or 178, wherein the first monomeric component 13 comprises an acrylic monomer having the structure:

$$(R^1)(R^2)C=C(R^3)(R^4)$$

wherein:

$R^1$ is —COOH, —COOR$^5$, —CONHOH, —CONHCH$_2$OH, or —CONH$_2$;

$R^2$ is —H, —CH$_3$, CH$_3$CH$_2$—, or —CN;

each of $R^3$ and $R^4$ is independently —H, —CH$_3$, CH$_3$CH$_2$—, or a halogen; and $R^5$ is a C$_{1-12}$alkyl, a C$_{1-12}$alkoxyalkyl, a C$_{1-12}$hydroxyalkyl, an acrylamide, or an alkylene-bis-acrylamide.

180. The method of any one of embodiments 177 to 179, wherein the first monomeric component 13 comprises N-methylolacrylamide, acrylic acid, acrylamide, an acrylic ester, or acrylonitrile.

181. The method of any one of embodiments 177 to 180, wherein the first monomeric component 13 comprises N-methylolacrylamide.

182. The method of any one of embodiments 177 to 181, wherein the container 200 further comprises a reducing agent 16 mixed with (i) the activated carbon 11, (ii) the first monomeric component 13 and (iii) the water 14.

183. The method of embodiment 182, wherein the reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

184. The method of embodiment 177 or 183, wherein the reducing agent 16 comprises a tertiary amine comprising tetramethylethylenediamine, N,N-dimethyl-toluedine or N,N-dihydroxyethyl-paratoluedine.

185. The method of any one of embodiments 177 to 184, wherein the container 200 further comprises a free radical scavenger 17 mixed with (i) the activated carbon 11, (ii) the first monomeric component 13 and (iii) the water 14.

186. The method of embodiment 185, wherein the free radical scavenger 17 comprises hydroquinone, monoethyl ether of hydroquinone, butylated hydroxyanisole, butylated hydroxytoluene, and t-butyl hydroquinone.

187. The method of any one of embodiments 177 to 186, wherein the container 200 further comprises one or more pharmaceuticals 20 within (i) the activated carbon 11, (ii) the first monomeric component 13 and (iii) the water 14.

188. The method of any one of embodiments 177 to 187, further comprising: incorporating the polymerization initiator 15 into the container 200 in an effective amount to cause polymerization of the first monomeric component 13.

189. The method of any one of embodiments 177 to 188, wherein the polymerization initiator 15 comprises zinc formaldehyde sulfoxylate, ammonium persulfate, a peroxide, or a perborate.

190. The method of any one of embodiments 177 to 189, wherein the polymerization initiator 15 comprises zinc formaldehyde sulfoxylate.

191. The method of any one of embodiments 177 to 190, wherein the container 200 comprises: a container housing 203 surrounding a container volume 202, a container opening 204 providing access to the container volume 202 from outside the container housing 203, and a movable container housing closure member 205 sized to extend over and cover the container opening 204.

192. The method of embodiments 188 to 191, wherein said incorporating step causes a mixture 24 within the container 200 to undergo a color change.

193. The method of any one of embodiments 177 to 192, wherein the container 200 further comprises a colorant 32 in addition to (i) the activated carbon 11, (ii) the first monomeric component 13 and (iii) the water 14.

194. The method of any one of embodiments 177 to 193, wherein the container 200 further comprises a colorant 32 in addition to (i) the first monomeric component 13 and (iii) the water 14, the colorant 32 comprising a red dye.

195. The method of embodiment 194, wherein said incorporating step causes the water 14 within the container 200 to undergo a color change from a red color to a yellow/orange color (or a weak yellow color or an opaque colorless solid).

196. The method of any one of embodiments 177 to 195, wherein said method further comprises: depositing one or more syringes 30, one or more needles 31, the one or more substrates 100 described in any one of embodiments 1 to 146, or any combination thereof into the container 200.

197. The method of any one of embodiments 177 to 195, wherein the container 200 further comprises one or more of, or all of: (i) the first monomeric component 13, (ii) the water 14, (iv) reducing agent 16, (v) the free radical scavenger 17, (vi) one or more substrates 100 described in any one of embodiments 1 to 172, and (vii) the colorant 32, separate from or in combination with, (viii) an effective amount of the polymerization initiator 15 as recited in any one of embodiments 188 to 190.

Pharmaceutical Disposal Kits

198. A pharmaceutical disposal kit 1000 comprising: (I) a container 200 comprising: a container housing 203 surrounding a container volume 202, a container opening 204 providing access to said container volume 202 from outside said container housing 203, and a movable container housing closure member 205 sized to extend over and cover said container opening 204; and (II) a mixture 24 within container 200, said mixture 24 comprising: (i) water 14 occupying at least a portion of said container volume 202, (ii) optionally activated carbon 11, and (iii) a first monomeric component 13 capable of polymerization when combined with an effective amount of a polymerization initiator 15. During use, mixture 24 may further comprise (III) at least one pharmaceutical 20 within said mixture 24. Pharmaceutical disposal kit 1000 may further comprise an optional wall or under-the-counter mounting device for mounting container 200 along a wall surface or under a counter. As discussed above, movable container housing closure member 205 may be in the form of a safety cap 205 to prevent a user's hand from extending into container 200.

199. The pharmaceutical disposal kit 1000 of embodiment 198, wherein said first monomeric component 13 comprises an acrylic or acrylamide monomer.

200. The pharmaceutical disposal kit 1000 of embodiment 198 or 199, wherein said first monomeric component 13 comprises an acrylic monomer having the structure:

$$(R^1)(R^2)C=C(R^3)(R^4)$$

wherein:
R$^1$ is —COOH, —COOR$^5$, —CONHOH, —CONHCH$_2$OH, or —CONH$_2$;
R$^2$ is —H, —CH$_3$, CH$_3$CH$_2$—, or —CN;
each of R$^3$ and R$^4$ is independently —H, —CH$_3$, CH$_3$CH$_2$—, or a halogen; and
R$^5$ is a C$_{1\text{-}12}$alkyl, a C$_{1\text{-}12}$alkoxyalkyl, a C$_{1\text{-}12}$hydroxyalkyl, an acrylamide, or an alkylene-bis-acrylamide.

201. The pharmaceutical disposal kit 1000 of any one of embodiments 198 to 200, wherein said first monomeric component 13 comprises N-methylolacrylamide, acrylic acid, acrylamide, an acrylic ester, or acrylonitrile.

202. The pharmaceutical disposal kit 1000 of any one of embodiments 198 to 201, wherein said first monomeric component 13 comprises N-methylolacrylamide.

203. The pharmaceutical disposal kit 1000 of any one of embodiments 198 to 202, wherein said container 200 further comprises a reducing agent 16 mixed with (i) said first monomeric component 13, (ii) said optional activated carbon 11, and (iii) said water 14.

204. The pharmaceutical disposal kit 1000 of embodiment 203, wherein said reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

205. The pharmaceutical disposal kit 1000 of embodiment 203 or 204, wherein said reducing agent 16 comprises a tertiary amine comprising, tetramethylethylenediamine, N,N-dimethyl-toluedine or N,N-dihydroxyethyl-paratoluedine.

206. The pharmaceutical disposal kit 1000 of any one of embodiments 198 to 205, wherein said container 200 further comprises a free radical scavenger 17 mixed with (i) said first monomeric component 13, (ii) said optional activated carbon 11, and (iii) said water 14.

207. The pharmaceutical disposal kit 1000 of embodiment 206, wherein said free radical scavenger 17 comprises hydroquinone, monoethyl ether of hydroquinone, butylated hydroxyanisole, butylated hydroxytoluene, and t-butyl hydroquinone.

208. The pharmaceutical disposal kit 1000 of any one of embodiments 198 to 207, wherein said container 200 further comprises a polymerization initiator 15 in an effective amount to cause polymerization of said first monomeric component 13.

209. The pharmaceutical disposal kit 1000 of embodiment 208, wherein said polymerization initiator 15 comprises zinc formaldehyde sulfoxylate, ammonium persulfate, a peroxide, or a perborate.

210. The pharmaceutical disposal kit 1000 of embodiment 208 or 209, wherein said polymerization initiator 15 comprises zinc formaldehyde sulfoxylate.

211. The pharmaceutical disposal kit 1000 of any one of embodiments 198 to 210, wherein said container volume 202 comprises up to about ten gallons (or any amount in increments of 0.1 gallons up to 10.0 gallons).

212. The pharmaceutical disposal kit 1000 of any one of embodiments 198 to 211, wherein said container volume 202 comprises from about 1.0 to about 5.0 gallons (or any amount in increments of 0.1 gallons between 1.1 and 4.9 gallons).

213. The pharmaceutical disposal kit 1000 of any one of embodiments 198 to 212, wherein said movable container housing closure member 205 comprises a removable lid 205 having lid engaging members 230 that engage with corresponding housing engaging members 250.

214. The pharmaceutical disposal kit 1000 of any one of embodiments 208 to 213, wherein said polymerization initiator 15 is packaged separately from said first monomeric component 13 prior to being combined with said first monomeric component 13.

215. The pharmaceutical disposal kit 1000 of embodiment 214, wherein said polymerization initiator 15 is packaged within a plastic bag or container 12.

216. The pharmaceutical disposal kit 1000 of any one of embodiments 198 to 215, wherein said mixture 24 further comprises a colorant 32.

217. The pharmaceutical disposal kit 1000 of embodiment 216, wherein said colorant 32 comprises a red dye.

218. The pharmaceutical disposal kit 1000 of embodiment 216 or 217, wherein said colorant 32 undergoes a color change when said mixture 24 is contacted with said polymerization initiator 15.

219. The pharmaceutical disposal kit 1000 of any one of embodiments 198 to 218, wherein said mixture 24 further comprises one or more syringes 30, one or more needles 31, one or more substrates 100 described in any one of embodiments 1 to 172, or any combination thereof Pharmaceutical and/or Sharps Disposal Kits 220. A pharmaceutical and/or sharps disposal kit 1000 comprising: (I) a container 200 comprising: a container housing 203 surrounding a container volume 202, a container opening 205 providing access to said container volume 202 from outside said container housing 203, and a movable container housing closure member 205 sized to extend over and cover said container opening 204; and (II) a mixture 24 within said container 200, said mixture 24 comprising: (i) water 14 occupying at least a portion of said container volume 202, (ii) optionally activated carbon 11, (iii) a first monomeric component 13 capable of polymerization when combined with an effective amount of a polymerization initiator 15, and (iv) an optional colorant 32, said colorant 32 enabling said mixture 24 to undergo a color change when combined with said effective amount of said polymerization initiator 15.

221. The pharmaceutical and/or sharps disposal kit 1000 of embodiment 220, wherein said first monomeric component 13 comprises an acrylic or acrylamide monomer.

222. The pharmaceutical and/or sharps disposal kit 1000 of embodiment 220 or 221, wherein said first monomeric component 13 comprises an acrylic monomer having the structure:

$$(R^1)(R^2)C=C(R^3)(R^4)$$

wherein:
R$^1$ is —COOH, —COOR$^5$, —CONHOH, —CONHCH$_2$OH, or —CONH$_2$;
R$^2$ is —H, —CH$_3$, CH$_3$CH$_2$—, or —CN;
each of R$^3$ and R$^4$ is independently —H, —CH$_3$, CH$_3$CH$_2$—, or a halogen; and
R$^5$ is a C$_{1\text{-}12}$alkyl, a C$_{1\text{-}12}$alkoxyalkyl, a C$_{1\text{-}12}$hydroxyalkyl, an acrylamide, or an alkylene-bis-acrylamide.

223. The pharmaceutical and/or sharps disposal kit 1000 of any one of embodiments 220 to 222, wherein said first monomeric component 13 comprises N-methylolacrylamide, acrylic acid, acrylamide, an acrylic ester, or acrylonitrile.

224. The pharmaceutical and/or sharps disposal kit 1000 of any one of embodiments 220 to 223, wherein said first monomeric component 13 comprises N-methylolacrylamide.

225. The pharmaceutical and/or sharps disposal kit 1000 of any one of embodiments 220 to 224, wherein said mixture 24 further comprises a reducing agent 16 mixed with (i) said first monomeric component 13, (ii) said optional activated carbon 11, (iii) said water 14 and (iv) said colorant 32.

226. The pharmaceutical and/or sharps disposal kit 1000 of embodiment 225, wherein said reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

227. The pharmaceutical and/or sharps disposal kit 1000 of embodiment 225 or 226, wherein said reducing agent 16 comprises a tertiary amine comprising tetramethylethylenediamine, N,N-dimethyl-toluedine or N,N-dihydroxyethyl-paratoluedine.

228. The pharmaceutical and/or sharps disposal kit 1000 of any one of embodiments 220 to 227, wherein said mixture 24 further comprises a free radical scavenger 17 mixed with (i) said first monomeric component 13, (ii) said optional activated carbon 11, (iii) said water 14 and (iv) said colorant 32.

229. The pharmaceutical and/or sharps disposal kit 1000 of embodiment 228, wherein said free radical scavenger 17 comprises hydroquinone, monoethyl ether of hydroquinone, butylated hydroxyanisole, butylated hydroxytoluene, and t-butyl hydroquinone.

230. The pharmaceutical and/or sharps disposal kit 1000 of any one of embodiments 220 to 229, wherein said colorant 32 comprises a red dye 32.

231. The pharmaceutical and/or sharps disposal kit 1000 of embodiment 230, wherein said red dye 32 enables a color change of said mixture 24 from a red color to a yellow/orange color when combined with said effective amount of said polymerization initiator 15.

232. The pharmaceutical and/or sharps disposal kit 1000 of any one of embodiments 220 to 231, wherein said container 200 further comprises a polymerization initiator 15 in an effective amount to cause polymerization of said first monomeric component 13.

233. The pharmaceutical and/or sharps disposal kit 1000 of embodiment 232, wherein said polymerization initiator 15 comprises zinc formaldehyde sulfoxylate, ammonium persulfate, a peroxide, or a perborate.

234. The pharmaceutical and/or sharps disposal kit 1000 of embodiment 232 or 233, wherein said polymerization initiator 15 comprises zinc formaldehyde sulfoxylate.

235. The pharmaceutical and/or sharps disposal kit 1000 of any one of embodiments 220 to 234, wherein said container volume 202 comprises up to about ten gallons.

236. The pharmaceutical and/or sharps disposal kit 1000 of any one of embodiments 220 to 235, wherein said container volume 202 comprises from about 1.0 to about 5.0 gallons.

237. The pharmaceutical and/or sharps disposal kit 1000 of any one of embodiments 220 to 236, wherein said movable container housing closure member 205 comprises a removable lid 205 having lid engaging members 230 that engage with corresponding housing engaging members 250.

238. The pharmaceutical and/or sharps disposal kit 1000 of any one of embodiments 232 to 237, wherein said polymerization initiator 15 is packaged separately from said first monomeric component 13 prior to being combined with said first monomeric component 13.

239. The pharmaceutical and/or sharps disposal kit 1000 of embodiment 238, wherein said polymerization initiator 15 is packaged within a plastic bag or container 12.

240. The pharmaceutical and/or sharps disposal kit 1000 of any one of embodiments 220 to 239, wherein said container 200 further comprises one or more pharmaceuticals 20, one or more syringes 30, one or more needles 31, one or more substrates 100 described in any one of embodiments 1 to 172, or any combination thereof within said mixture 24.

241. The pharmaceutical and/or sharps disposal kit 1000 of any one of embodiments 220 to 240, wherein said container 200 further comprises one or more syringes 30, one or more needles 31, one or more substrates 100 described in any one of embodiments 1 to 172, or any combination thereof within said mixture 24.

242. The pharmaceutical and/or sharps disposal kit 1000 of any one of embodiments 220 to 241, wherein said container 200 further comprises one or more pharmaceuticals 20 within said mixture 24.

243. The pharmaceutical and/or sharps disposal kit 1000 of any one of embodiments 220 to 242, wherein said container 200 further comprises one or more of, or all of: (i) the first monomeric component 13, (ii) the optional activated carbon 11, (iii) the water 14, (iv) reducing agent 16, (v) the free radical scavenger 17, and (vi) the colorant 32, separate from or in combination with, (vii) an effective amount of the polymerization initiator 15 as recited in any one of embodiments 232 to 234.

Methods of Disposing of Pharmaceuticals and/or Sharps

244. A method of disposing of pharmaceutical 20 and/or sharps 30/31, said method comprising: depositing one or more pharmaceuticals 20, one or more syringes 30, one or more needles 31, one or more substrates 100 described in any one of embodiments 1 to 172, or any combination thereof into a container 200 containing a mixture 24 of: (i) water 14, (ii) optional activated carbon 11, (iii) a first monomeric component 13 capable of polymerization when combined with an effective amount of a polymerization initiator 15, and (iv) an optional colorant 32, the colorant 32 enabling the mixture 24 to undergo a color change when combined with the effective amount of the polymerization initiator 15.

245. The method of embodiment 244, wherein the first monomeric component 13 comprises an acrylic or acrylamide monomer.

246. The method of embodiment 244 or 245, wherein the first monomeric component 13 comprises an acrylic monomer having the structure:

$$(R^1)(R^2)C{=}C(R^3)(R^4)$$

wherein:

$R_1$ is —COOH, —COOR$^5$, —CONHOH, —CONHCH$_2$OH, or —CONH$_2$;

$R^2$ is —H, —CH$_3$, CH$_3$CH$_2$—, or —CN;

each of $R^3$ and $R^4$ is independently —H, —CH$_3$, CH$_3$CH$_2$—, or a halogen; and $R^5$ is a C$_{1\text{-}12}$alkyl, a C$_{1\text{-}12}$alkoxyalkyl, a C$_{1\text{-}12}$hydroxyalkyl, an acrylamide, or an alkylene-bis-acrylamide.

247. The method of any one of embodiments 244 to 246, wherein the first monomeric component 13 comprises N-methylolacrylamide, acrylic acid, acrylamide, an acrylic ester, or acrylonitrile.

248. The method of any one of embodiments 244 to 247, wherein the first monomeric component 13 comprises N-methylolacrylamide.

249. The method of any one of embodiments 244 to 248, wherein the mixture 24 further comprises a reducing agent 16 mixed with (i) the first monomeric component 13, (ii) the optional activated carbon 11, (iii) the water 14, and (iv) the colorant 32.

250. The method of embodiment 249, wherein the reducing agent 16 comprises benzotriazole, sodium nitrite, sodium-meta-bisulfite, isoascorbic acid, sodium sulfite, aniline, sodium sulfate, pyridine, a tertiary amine, or any combination thereof.

251. The method of embodiment 249 or 250, wherein the reducing agent 16 comprises a tertiary amine comprising tetramethylethylenediamine, N,N-dimethyl-toluedine or N,N-dihydroxyethyl-paratoluedine.

252. The method of any one of embodiments 244 to 251, wherein the mixture 24 further comprises a free radical scavenger 17 mixed with (i) the first monomeric component 13, (ii) the optional activated carbon 11, (iii) the water 14, and (iv) the colorant 32.

253. The method of embodiment 252, wherein the free radical scavenger 17 comprises hydroquinone, monoethyl ether of hydroquinone, butylated hydroxyanisole, butylated hydroxytoluene, and t-butyl hydroquinone.

254. The method of any one of embodiments 244 to 253, wherein the mixture 24 further comprises one or more pharmaceuticals 20, one or more syringes 30, one or more needles 31, or any combination thereof.

255. The method of any one of embodiments 244 to 254, wherein the mixture 24 further comprises one or more syringes 30, one or more needles 31, or any combination thereof.

256. The method of any one of embodiments 244 to 255, wherein the mixture 24 further comprises one or more pharmaceuticals 20.

257. The method of any one of embodiments 244 to 256, wherein the colorant 32 comprises a red dye.

258. The method of any one of embodiments 244 to 257, further comprising: incorporating the polymerization initiator 15 into the container 200 in an effective amount to cause polymerization of the first monomeric component 13.

259. The method of any one of embodiments 244 to 258, wherein the polymerization initiator 15 comprises zinc formaldehyde sulfoxylate, ammonium persulfate, a peroxide, or a perborate.

260. The method of any one of embodiments 244 to 259, wherein the polymerization initiator 15 comprises zinc formaldehyde sulfoxylate.

261. The method of any one of embodiments 244 to 260, wherein the container 200 comprises: a container housing 203 surrounding a container volume 202, a container opening 204 providing access to the container volume 202 from outside the container housing 203, and a movable container housing closure member 205 sized to extend over and cover the container opening 204.

Additional Solid Pharmaceutical Disposal Kits

262. A solid pharmaceutical disposal kit comprising: a solidifying composition, the solidifying composition comprising activated carbon 11 and (i) a gelling agent (not shown), (ii) superabsorbent particles 19, (iii) a first monomeric component 13 that is capable of polymerization when combined with an effective amount of a polymerization initiator 15, or (iv) any combination of (i), (ii), and (iii). The gelling agent can be any of the above-described gelling agents or superabsorbent particles 19. Suitable first monomeric components 13 and polymerization initiators 15 include any of those described herein.

263. The solid pharmaceutical disposal kit of embodiment 262, wherein the activated carbon 11 is incorporated within the gelling agent. In some embodiments, the gelling agent may be impregnated with activated carbon 11. In some embodiments, the superabsorbent particles 19 may be impregnated with activated carbon 11. In some embodiments, the first monomeric component 13 may be combined with activated carbon 11.

264. The solid pharmaceutical disposal kit of embodiment 262 or 263, wherein the solidifying composition further comprises fibers, foam, a fiber-containing mass (e.g., a nonwoven fabric or nonwoven mass such as a cotton/fibrous ball), a foam-containing mass, any of the above-described substrates 100, or any combination thereof.

265. The solid pharmaceutical disposal kit of any one of embodiments 262 to 264, wherein the solidifying composition comprises one or more of, or all of: (i) the first monomeric component 13, (ii) the optional activated carbon 11, (iii) the water 14, (iv) reducing agent 16, (v) the free radical scavenger 17, and (vi) the colorant 32, separate from or in combination with, (vii) an effective amount of the polymerization initiator 15 as recited in any one of embodiments 232 to 234.

Pharmaceutical-Containing Compositions

266. A pharmaceutical-containing composition resulting from the method of any one of embodiments 173 to 197. In some embodiments, the pharmaceutical-containing composition comprises a liquid mixture comprising first monomeric component 13, optional activated carbon 11, water 14 and at least one pharmaceutical 20 within the liquid mixture. In other embodiments, the pharmaceutical-containing composition comprises a solid polymer matrix comprising polymerized first monomeric component 13, optional activated carbon 11, water 14 and at least one pharmaceutical 20 within the solid polymer matrix.

267. A composition resulting from the method of embodiment 266, said composition comprising (i) one or more pharmaceuticals 20, and at least one of (ii) one or more syringes 30 and (iii) one or more needles 31. In some embodiments, the composition comprises a liquid mixture 24 comprising first monomeric component 13, optional activated carbon 11, water 14, at least one pharmaceutical 20, and one or more syringes 30, one or more needles 31, or any combination within the liquid mixture 24. In other embodiments, the pharmaceutical-containing composition comprises a solid polymer matrix comprising polymerized first monomeric component 13, activated carbon 11, water 14, at least one pharmaceutical 20, and one or more syringes 30, one or more needles 31, or any combination within the solid polymer matrix.

Pharmaceutical- and/or Sharps-Containing Compositions

268. A composition resulting from the method of any one of embodiments 244 to 261. In some embodiments, the composition comprises a liquid mixture 24 comprising first monomeric component 13, optional activated carbon 11, water 14, colorant 32, and one or more of (i) one or more pharmaceuticals 20, (ii) one or more syringes 30, and (iii) one or more needles 31 within the liquid mixture 24. In other embodiments, the composition comprises a solid polymer matrix comprising polymerized first monomeric component 13, optional activated carbon 11, water 14, colorant 32, and one or more of (i) one or more pharmaceuticals 20, (ii) one or more syringes 30, (iii) one or more needles 31, and (iv) one or more substrates 100 described in any one of embodiments 1 to 172 within the solid polymer matrix.

Waste Disposal Substrates

269. A waste disposal substrate 100 comprising: the substrate 100 described in any one of embodiments 1 to 219.

270. A waste disposal substrate 100 comprising: (a) at least one layer of fibers, (b) at least one layer comprising activated carbon; and (c) at least one layer comprising superabsorbent particles.

271. The waste disposal substrate 100 of embodiment 269 or 270, wherein the substrate 100 comprises from two to eight fiber-containing layers 110.

272. The waste disposal substrate 100 of any one of embodiments 269 to 271, wherein the substrate 100 comprises from two to eight nonwoven layers 110.

273. The waste disposal substrate 100 of any one of embodiments 269 to 272, wherein each nonwoven layer 110 (1) independently comprises polymeric fibers (e.g., polypropylene fibers), cellulosic fibers (e.g., wood pulp fibers), or any combinations thereof, and (2) independently has a basis weight of from about 10.0 grams per square meter (gsm) to about 180.0 gsm. As discussed above, each nonwoven layer 110 may (1) independently comprise polypropylene fibers or any other polymeric fibers, wood pulp fibers, or a combination of polymeric fibers with or without wood pulp fibers, and (2) independently have a basis weight of from about 10.0 gsm to about 180.0 gsm, or any basis weight between 10.0 gsm and 180.0 gsm, in increments of 0.1 gsm (e.g., 18.0 gsm or 20.0 gsm or 45.5 gsm or from about 11.0 gsm to about 150 gsm or from about 20 gsm to about 175 gsm).

274. The waste disposal substrate 100 of any one of embodiments 269 to 273, wherein the substrate 100 comprises (a) at least one nonwoven layer 110 that independently comprises polypropylene fibers, and independently has a basis weight of from about 11.0 gsm to about 150.0 gsm, preferably, about 18.0 gsm, (b) at least one nonwoven layer 110 that independently comprises wood pulp fibers, and independently has a basis weight of from about 20.0 gsm to about 175.0 gsm, preferably, about 172.0 gsm, or (c) both (a) and (b). See again, for example, exemplary substrates 100 shown in FIGS. 7B and 7D, wherein in some embodiments, innermost nonwoven layers 110 positioned between activated carbon-containing nonwoven layer 110 comprise (b) nonwoven layers 110 that each independently comprise wood pulp fibers, and independently have a basis weight of from about 20.0 gsm to about 175.0 gsm, preferably, about 172.0 gsm, and outermost nonwoven layers 110 positioned along opposite major surfaces comprise (a) nonwoven layers 110 that each independently comprise polypropylene fibers, and independently have a basis weight of from about 11.0 gsm to about 150.0 gsm, preferably, about 18.0 gsm.

275. The waste disposal substrate 100 of any one of embodiments 269 to 274, wherein the substrate 100 comprises from two to six layers containing activated carbon 111.

276. The waste disposal substrate 100 of any one of embodiments 269 to 275, wherein the substrate 100 comprises four layers containing activated carbon 111. See, for example, substrate 100 shown in FIGS. 7A-7D.

277. The waste disposal substrate 100 of any one of embodiments 269 to 276, wherein the substrate 100 comprises (i) at least one layer containing activated carbon 111 in combination with fibers, and (ii) at least one layer containing activated carbon 111 but no fibers.

278. The waste disposal substrate 100 of any one of embodiments 269 to 277, wherein the substrate 100 comprises (i) at least two layers containing activated carbon 111 in combination with fibers, and (ii) at least two layers containing activated carbon 111 but no fibers.

279. The waste disposal substrate 100 of any one of embodiments 269 to 278, wherein the substrate 100 comprises from two to six layers containing superabsorbent particles 114.

280. The waste disposal substrate 100 of any one of embodiments 269 to 279, wherein the substrate 100 comprises from two to three layers containing superabsorbent particles 114. See again, for example, substrate 100 shown in FIGS. 7A-7D.

281. The waste disposal substrate 100 of any one of embodiments 269 to 280, wherein the substrate 100 comprises at least one layer containing a mixture of activated carbon 11 and superabsorbent particles 19. See again, for example, substrate 100 shown in FIGS. 7A-7D.

282. The waste disposal substrate 100 of any one of embodiments 269 to 281, wherein the substrate 100 comprises at least two layers containing a mixture of activated carbon 11 and superabsorbent particles 19. See again, for example, substrate 100 shown in FIGS. 7A-7D.

283. The waste disposal substrate 100 of any one of embodiments 269 to 282, wherein the substrate 100 comprises at least one layer comprising (or consisting of) superabsorbent particles 19. See, for example, substrate 100 shown in FIGS. 7C-7D.

284. The waste disposal substrate 100 of any one of embodiments 269 to 283, wherein the substrate 100 comprises (a) two outermost nonwoven layers 110, (b) two nonwoven layers containing activated carbon adjacent to and between the two outermost nonwoven layers 110, and (c) at least one layer containing a mixture of activated carbon 11 and superabsorbent particles 19 between the two nonwoven layers containing activated carbon.

285. The waste disposal substrate 100 of any one of embodiments 269 to 284, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, and (d) at least one nonwoven layer positioned between the two layers containing a mixture of activated carbon 11 and superabsorbent particles 19.

286. The waste disposal substrate 100 of any one of embodiments 269 to 285, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, and (d) two interior nonwoven layers positioned between the two layers containing a mixture of activated carbon 11 and superabsorbent particles 19.

287. The waste disposal substrate 100 of any one of embodiments 269 to 286, wherein the substrate 100 comprises (a) two outermost nonwoven layers 110, (b) two nonwoven layers containing activated carbon adjacent to and between the two outermost nonwoven layers 110, (c) two layers containing a mixture of activated carbon 11 and superabsorbent particles 19 adjacent to and between the two nonwoven layers containing activated carbon, (d) two interior nonwoven layers positioned between the two layers containing a mixture of activated carbon 11 and superabsorbent particles 19, and (e) a layer comprising (or consisting of) superabsorbent particles 19 positioned between the two interior nonwoven layers. See again, for example, substrate 100 shown in FIGS. 7C-7D.

288. The waste disposal substrate 100 of any one of embodiments 269 to 287, wherein the substrate 100 has an overall length Lo ranging from about 3.0 inches (in) to about 48.0 in, an overall width $W_O$ ranging from about 1.0 in to about 48.0 in, and an overall thickness $T_O$ ranging from about 0.10 in to about 1.0 in.

289. The waste disposal substrate 100 of any one of embodiments 269 to 288, wherein the substrate 100 has an overall length Lo ranging from about 3.0 in to about 12.0 in, an overall width $W_O$ ranging from about 9.0 in to about 12.0 in, and an overall thickness $T_O$ ranging from about 0.15 in to about 0.5 in.

290. The waste disposal substrate 100 of any one of embodiments 269 to 289, wherein the substrate 100 comprises from about 0.5 grams (g) to about 100.0 g of the activated carbon 11 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

291. The waste disposal substrate 100 of any one of embodiments 269 to 290, wherein the substrate 100 comprises from about 1.2 g to about 12.0 g of the activated carbon 11.

292. The waste disposal substrate 100 of any one of embodiments 269 to 291, wherein the substrate 100 comprises from about 0.5 grams (g) to about 100.0 g of the superabsorbent particles 19 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

293. The pharmaceutical disposal kit 1000 of any one of embodiments 269 to 292, wherein the substrate 100 comprises from about 1.2 g to about 12.0 g of the superabsorbent particles 19.

Methods of Using Waste Disposal Substrates

294. A method of using the waste disposal substrate 100 of any one of embodiments 269 to 293, said method comprising: contacting the waste disposal substrate 100 with a liquid fluid, the waste disposal substrate 100 comprising: (a) at least one layer of fibers 110, (b) at least one layer comprising activated carbon 111; and (c) at least one layer comprising superabsorbent particles 114, wherein the liquid fluid, or a component therein, is collected, dissolved, adsorbed, inactivated, destroyed, and/or disposed of within the waste disposal substrate 100.

295. A method of using a waste disposal substrate 100, said method comprising: contacting the waste disposal substrate 100 with a liquid fluid, the waste disposal substrate 100 comprising: (a) at least one layer of fibers 110, (b) at least one layer comprising activated carbon 111; and (c) at least one layer comprising superabsorbent particles 114, wherein the liquid fluid, or a component therein, is collected, dissolved, adsorbed, inactivated, destroyed, and/or disposed of within the waste disposal substrate 100.

296. The method of embodiment 294 or 295, wherein said contacting step comprises: bringing the waste disposal substrate 100 into contact with the liquid fluid.

297. The method of any one of embodiments 294 to 296, wherein said contacting step comprises: using the waste disposal substrate 100 as a wipe (e.g., a wiping structure having a size and shape similar to a paper towel).

298. The method of any one of embodiments 294 to 297, wherein the liquid fluid comprises one or more of: a liquid pharmaceutical, a liquid phase containing a dissolved solid pharmaceutical, regulated liquid waste, and non-regulated liquid waste.

299. The method of any one of embodiments 294 to 298, wherein the liquid fluid comprises a liquid pharmaceutical or a liquid phase containing a dissolved solid pharmaceutical.

300. The method of embodiment 294 or 295, wherein said contacting step comprises: bringing the liquid fluid into contact with the waste disposal substrate 100.

301. The method of any one of embodiments 294 to 295 and 300, wherein said contacting step comprises: introducing the liquid fluid onto and into the waste disposal substrate 100.

302. The method of any one of embodiments 294 to 295 and 300 to 301, wherein the waste disposal substrate is positioned within a container.

303. The method of embodiment 302, wherein the container has a container volume of up to about 10.0 gallons.

304. The method of embodiment 302 or 303, wherein the container volume is from about 1.0 gallon to about 5.0 gallons.

305. The method of any one of embodiments 302 to 304, further comprising: discarding into the container one or more of: a liquid pharmaceutical, a solid pharmaceutical within a liquid phase, regulated waste, and non-regulated waste.

306. The method of embodiment 305, further comprising: discarding into the container: a liquid pharmaceutical or a solid pharmaceutical within a liquid phase.

307. The method of any one of embodiments 294 to 295 and 300 to 301, wherein the waste disposal substrate is positioned along a surface in a work or medical or manufacturing setting so as to prevent the liquid fluid from contacting the surface.

308. The method of embodiment 307, wherein the liquid fluid comprises one or more of: a liquid pharmaceutical, a liquid phase containing a dissolved solid pharmaceutical, regulated liquid waste, and non-regulated liquid waste.

309. The method of embodiment 308, wherein the liquid fluid comprises a liquid pharmaceutical or a liquid phase containing a dissolved solid pharmaceutical.

310. The method of any one of embodiments 294 to 309, wherein the substrate 100 comprises from about 0.5 grams (g) to about 100.0 g of the activated carbon 11 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

311. The method of any one of embodiments 294 to 310, wherein the substrate 100 comprises from about 1.2 g to about 12.0 g of the activated carbon 11.

312. The method of any one of embodiments 294 to 311, wherein the substrate 100 comprises from about 0.5 grams (g) to about 100.0 g of the superabsorbent particles 19 (or any amount, in increments of 0.01 g, between 0.5 g and 100.0 g, e.g., 1.45 g, or any range between 0.5 g and 100.0 g, in increments of 0.01 g, e.g., from about 1.48 g to 10.8 g)

313. The method of any one of embodiments 294 to 312, wherein the substrate 100 comprises from about 1.2 g to about 12.0 g of the superabsorbent particles 19.

In addition, it should be understood that although the above-described pharmaceutical disposal kits and methods are described as "comprising" one or more components or steps, the above-described pharmaceutical disposal kits and methods may "comprise," "consists of," or "consist essentially of" the above-described components or steps of the pharmaceutical disposal kits and methods. Consequently, where the present invention, or a portion thereof, has been described with an open-ended term such as "comprising," it should be readily understood that (unless otherwise stated) the description of the present invention, or the portion thereof, should also be interpreted to describe the present invention, or a portion thereof, using the terms "consisting essentially of" or "consisting of" or variations thereof as discussed below.

As used herein, the terms "comprises," "comprising," "includes," "including," "has," "having," "contains," "containing," "characterized by," or any other variation thereof, are intended to encompass a non-exclusive inclusion, subject to any limitation explicitly indicated otherwise, of the recited components. For example, a pharmaceutical disposal kit and/or method that "comprises" a list of elements (e.g., components or steps) is not necessarily limited to only those elements (or components or steps), but may include other elements (or components or steps) not expressly listed or inherent to the pharmaceutical disposal kit and/or method.

As used herein, the transitional phrases "consists of" and "consisting of" exclude any element, step, or component not specified. For example, "consists of" or "consisting of" used in a claim would limit the claim to the components, materials or steps specifically recited in the claim except for impurities ordinarily associated therewith (i.e., impurities within a given component). When the phrase "consists of" or "consisting of" appears in a clause of the body of a claim, rather than immediately following the preamble, the phrase "consists of" or "consisting of" limits only the elements (or components or steps) set forth in that clause; other elements (or components) are not excluded from the claim as a whole.

As used herein, the transitional phrases "consists essentially of" and "consisting essentially of" are used to define a pharmaceutical disposal kit and and/or a method that includes materials, steps, features, components, or elements, in addition to those literally disclosed, provided that these additional materials, steps, features, components, or elements do not materially affect the basic and novel characteristic(s) of the claimed invention. The term "consisting essentially of" occupies a middle ground between "comprising" and "consisting of."

Further, it should be understood that the herein-described pharmaceutical disposal kits and/or methods may comprise, consist essentially of, or consist of any of the herein-described components and features, as shown in the figures with or without any feature(s) not shown in the figures. In other words, in some embodiments, the pharmaceutical disposal kits of the present invention do not have any additional features other than those shown in the figures, and such additional features, not shown in the figures, are specifically excluded from the pharmaceutical disposal kits. In other embodiments, the pharmaceutical disposal kits of the present invention do have one or more additional features that are not shown in the figures. The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

Pharmaceutical and/or sharps disposal kits similar to exemplary pharmaceutical and/or sharps disposal kit 1000 shown in FIGS. 1-12 were prepared and utilized in a home environment, as well as a commercial environment (e.g., a pharmacy). Each mixture within a given pharmaceutical and/or sharps disposal kit had one of the following compositions:

Formulation 1:
Water—73.8 wt %

N-methylolacrylamide—26 wt %
Sodium Nitrite—0.1 wt %
Benzotriazole—0.1 wt %
Activated Carbon—0.1 to 3.0 wt %
Formulation 2:
Water—73.75 wt %
N-methylolacrylamide—26 wt %
Sodium Nitrite—0.1 wt %
Benzotriazole—0.1 wt %
Red Dye—0.05 wt %
Activated Carbon—0.1 to 3.0 wt %

Each kit also contained a separate package of polymerization initiator comprising either ammonium persulfate or zinc formaldehyde sulfoxylate.

Upon polymerization of the mixtures of Formulation 2, the mixture turns from a red color to a yellow color (i.e., a very pale yellow; could also be described as a colorless opaque solid).

The present invention is described above and further illustrated below by way of claims, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

What is claimed is:

1. A waste disposal substrate comprising:

(a) at least one layer of fibers, (b) at least one layer comprising activated carbon; and (c) at least one layer comprising superabsorbent particles, wherein:

the waste disposal substrate comprises from two to eight nonwoven layers, the waste disposal substrate comprises (i) at least one layer containing activated carbon in combination with fibers, and (ii) at least one layer containing activated carbon but no fibers, at least one layer of the waste disposal substrate contains a mixture of activated carbon and superabsorbent particles, and the waste disposal substrate comprises (i) two outermost nonwoven layers, (ii) two nonwoven layers containing activated carbon adjacent to and between the two outermost nonwoven layers, (iii) two layers containing a mixture of activated carbon and superabsorbent particles adjacent to and between the two nonwoven layers containing activated carbon, and (iv) two interior nonwoven layers positioned between the two layers containing a mixture of activated carbon and superabsorbent particles.

2. The waste disposal substrate of claim 1, wherein the waste disposal substrate has an overall length $L_O$ ranging from about 3.0 inches (in) to about 48.0 in, an overall width $W_O$ ranging from about 1.0 in to about 48.0 in, and an overall thickness $T_O$ ranging from about 0.10 in to about 1.0 in.

3. The waste disposal substrate of claim 1, wherein at least one layer of superabsorbent particles extends within the substrate and is positioned a distance from opposite major outer surfaces of the substrate.

4. The waste disposal substrate of claim 1, wherein at least one layer of superabsorbent particles extends along an outer surface of the substrate.

5. The waste disposal substrate of claim 1, wherein at least one layer of superabsorbent particles extends within the substrate and is positioned a distance from opposite major outer surfaces of the substrate.

6. The waste disposal substrate of claim 1, wherein the substrate comprises two or more layers of superabsorbent particles.

7. The waste disposal substrate of claim 1, wherein the substrate comprises at least one layer that includes both superabsorbent particles and fibers.

8. The waste disposal substrate of claim 1, wherein superabsorbent particles extend along all outer surfaces of the substrate except an upper surface of the substrate.

9. The waste disposal substrate of claim 1, wherein the substrate comprises: (i) at least one layer of superabsorbent particles that extends within the substrate and is positioned a distance from opposite major outer surfaces of the substrate; (ii) at least two layers of activated carbon; and (iii) an outermost fiber-containing layer.

10. The waste disposal substrate of claim 9, wherein a particular two layers of the at least two layers of activated carbon are positioned along opposite sides of a particular one of the at least one layer of superabsorbent particles.

11. The waste disposal substrate of claim 10, wherein the particular two layers of the activated carbon and the particular layer of superabsorbent particles are bonded to one another, with the particular layer of superabsorbent particles being sandwiched between the particular two layers of the activated carbon.

12. The waste disposal substrate of claim 1, wherein the substrate comprises two outermost fiber-containing layers with one outermost fiber-containing layer being positioned along each of two opposite major outer surfaces of the substrate.

13. The waste disposal substrate of claim 12, wherein each of the two outermost fiber-containing layers comprises a nonwoven layer.

14. The waste disposal substrate of claim 1, wherein the substrate comprises an outermost non-penetrable layer positioned along an opposite major outer surface of the substrate from an outermost fiber-containing layer of the substrate.

15. The waste disposal substrate of claim 14, wherein:
(i) the outermost non-penetrable layer comprises a film layer, and
(ii) the outermost fiber-containing layer comprises a nonwoven layer.

16. A waste disposal substrate comprising:
(a) at least one layer comprising activated carbon; and
(b) at least one layer comprising superabsorbent particles, wherein:
(1) the waste disposal substrate comprises from two to eight nonwoven layers;
(2) the waste disposal substrate comprises:
(i) at least one layer containing activated carbon in combination with fibers, and
(ii) at least one layer containing activated carbon but no fibers;
(3) at least one layer of the waste disposal substrate contains a mixture of activated carbon and superabsorbent particles; and
(4) the waste disposal substrate comprises:
(i) two outermost nonwoven layers,
(ii) two nonwoven layers containing activated carbon adjacent to and between the two outermost nonwoven layers,
(iii) two layers containing a mixture of activated carbon and superabsorbent particles adjacent to and between the two nonwoven layers containing activated carbon, and
(iv) two interior nonwoven layers positioned between the two layers containing a mixture of activated carbon and superabsorbent particles.

17. The waste disposal substrate of claim 16, wherein at least one layer of superabsorbent particles extends within the substrate and is positioned a distance from opposite major outer surfaces of the substrate.

18. The waste disposal substrate of claim 16, wherein at least one layer of superabsorbent particles extends along an outer surface of the substrate.

19. The waste disposal substrate of claim 16, wherein at least one layer of superabsorbent particles extends within the substrate and is positioned a distance from opposite major outer surfaces of the substrate.

20. The waste disposal substrate of claim 16, wherein the substrate comprises two or more layers of superabsorbent particles.

21. The waste disposal substrate of claim 16, wherein the substrate comprises at least one layer that includes both superabsorbent particles and fibers.

* * * * *